US011950352B2

(12) United States Patent
Agustsson et al.

(10) Patent No.: US 11,950,352 B2
(45) **Date of Patent: *Apr. 2, 2024**

(54) SPLIT STRUCTURE PARTICLE ACCELERATORS

(71) Applicant: RADIABEAM TECHNOLOGIES, LLC, Santa Monica, CA (US)

(72) Inventors: Ronald Agustsson, Venice, CA (US); Salime Boucher, Santa Monica, CA (US); Sergey Kutsaev, Santa Monica, CA (US)

(73) Assignee: RADIABEAM TECHNOLOGIES, LLC, Santa Monica, CA (US)

( * ) Notice: Subject to any disclaimer, the term of this patent is extended or adjusted under 35 U.S.C. 154(b) by 519 days.

This patent is subject to a terminal disclaimer.

(21) Appl. No.: 17/180,458

(22) Filed: Feb. 19, 2021

(65) Prior Publication Data

US 2021/0204389 A1 Jul. 1, 2021

Related U.S. Application Data

(63) Continuation of application No. 16/676,766, filed on Nov. 7, 2019, now Pat. No. 10,932,354, which is a (Continued)

(51) Int. Cl.
*H05H 7/16* (2006.01)
*H01P 3/127* (2006.01)
(Continued)

(52) U.S. Cl.
CPC ............... *H05H 7/16* (2013.01); *H01P 3/127* (2013.01); *H01P 11/002* (2013.01); *H05H 7/22* (2013.01); *H05H 2007/225* (2013.01)

(58) Field of Classification Search
None
See application file for complete search history.

(56) References Cited

U.S. PATENT DOCUMENTS 2,945,981 A 7/1960 Karp
5,578,909 A 11/1996 Billen
(Continued)

FOREIGN PATENT DOCUMENTS

CA 2790793 1/2011
CN 202095170 U 12/2011
(Continued)

OTHER PUBLICATIONS

Hoag, et al., Accelerator Structure Development for NLC (Work supported by Department of Energy Contracts DE-AC03-76SF00515 (SLAC), IEEE, 1993, pp. 907-909.
(Continued)

*Primary Examiner* — Srinivas Sathiraju
(74) *Attorney, Agent, or Firm* — Knobbe, Martens, Olson & Bear, LLP

(57) ABSTRACT

A particle accelerator can include a first waveguide portion and a second waveguide portion. The first waveguide portion can include a first plurality of cell portions and a first iris portion that is disposed between two of the first plurality of cell portions. The first iris portion can include a first portion of an aperture such that the aperture is configured to be disposed about a beam axis. The first waveguide portion can further include a first bonding surface. The second waveguide portion can include a second plurality of cell portions and a second iris portion that is disposed between two of the second plurality of cell portions. The second iris portion can include a second portion of the aperture. The second waveguide portion can include a second bonding surface.

20 Claims, 14 Drawing Sheets

Related U.S. Application Data continuation of application No. PCT/US2018/035346, filed on May 31, 2018.

(60) Provisional application No. 62/513,911, filed on Jun. 1, 2017.

(51) Int. Cl.
*H01P 11/00* (2006.01)
*H05H 7/22* (2006.01)

(56) References Cited

U.S. PATENT DOCUMENTS 5,796,314 A 8/1998 Tantawi et al.
6,376,990 B1 4/2002 Allen et al.
6,448,722 B1 * 9/2002 Yu ........................ H05H 7/08 250/423 P
6,465,957 B1 10/2002 Whitham et al.
6,642,677 B1 * 11/2003 Douglas ................... H05H 7/06 315/505
6,646,383 B2 11/2003 Bertsche et al.
7,046,765 B2 5/2006 Wong et al.
7,400,096 B1 7/2008 Foster et al.
7,411,361 B2 8/2008 Agustsson et al.
7,423,381 B2 9/2008 Hanna
7,554,275 B2 * 6/2009 Amaldi .................... H05H 6/00 315/505
7,764,324 B2 7/2010 Andonian et al.
7,935,219 B2 * 5/2011 Medoff .................. B27K 5/004 162/158
8,026,768 B1 9/2011 Burt et al.
8,070,912 B2 * 12/2011 Medoff ................ B27K 5/0035 162/158
8,107,589 B2 1/2012 Sakurai et al.
8,148,922 B2 4/2012 Cleland et al.
8,277,607 B2 * 10/2012 Medoff .................. B27K 5/004 435/165
8,900,407 B2 * 12/2014 Medoff ................... C08B 15/04 435/165
8,947,115 B2 2/2015 Rosenzweig et al.
9,023,765 B1 5/2015 Rimmer et al.
9,287,598 B2 3/2016 Tantawi et al.
9,386,682 B2 7/2016 Tantawi et al.
9,398,681 B2 7/2016 Tantawi et al.
9,487,915 B2 * 11/2016 Medoff .................... C08H 8/00
9,640,851 B2 5/2017 Nantista et al.
9,736,922 B2 8/2017 Trummer
9,847,205 B2 12/2017 Sherman et al.
9,867,271 B2 1/2018 Saverskiy
9,913,360 B1 3/2018 Antipov et al.
9,931,522 B2 4/2018 Bharadwaj et al.
10,212,800 B2 2/2019 Agustsson et al.
10,263,170 B1 4/2019 Brink et al.
10,383,205 B2 * 8/2019 Lal ........................... H05H 9/04
10,609,809 B2 3/2020 Agustsson et al.
10,880,985 B2 12/2020 Agustsson et al.
10,912,184 B2 * 2/2021 Lal ........................... H05H 9/04
10,932,354 B2 * 2/2021 Agustsson ............... H05H 9/00
11,612,049 B2 * 3/2023 Agustsson ............. H05H 9/048
11,800,631 B2 * 10/2023 Agustsson ............... H05H 9/00
2006/0115323 A1 6/2006 Coppeta
2006/0255991 A1 11/2006 De Abreu et al.
2007/0040113 A1 2/2007 Monroe et al.
2007/0086569 A1 4/2007 Johnsen
2007/0108922 A1 * 5/2007 Amaldi .................... H05H 6/00 315/502
2010/0320403 A1 12/2010 Amaldi et al.
2011/0060133 A1 * 3/2011 Medoff ...................... C08J 3/28 204/157.68
2011/0290379 A1 12/2011 Murokh et al.
2012/0074337 A1 * 3/2012 Medoff ................... C08B 15/04 250/492.1
2012/0294423 A1 11/2012 Cheung et al.
2012/0319085 A1 12/2012 Gambetta et al.
2013/0163707 A1 1/2013 Habs et al.
2013/0088224 A1 4/2013 Koizumi
2014/0119496 A1 5/2014 Zhou et al.
2014/0191654 A1 7/2014 Tantawi et al.
2014/0333395 A1 11/2014 Tantawi et al.
2015/0057484 A1 2/2015 Amaldi
2015/0194720 A1 7/2015 Tantawi
2015/0338545 A1 11/2015 Arodzero et al.
2015/0340752 A1 11/2015 Nantista et al.
2015/0359080 A1 12/2015 Dolgashev
2016/0102631 A1 4/2016 Lynn
2016/0193481 A1 7/2016 Tantawi et al.
2016/0310764 A1 10/2016 Bharadwaj et al.
2017/0094770 A1 3/2017 Kephart
2017/0095942 A1 * 4/2017 Medoff ................... C08B 15/04
2017/0226689 A1 * 8/2017 Medoff .................... D21B 1/10
2017/0325326 A1 11/2017 Tantawi et al.
2017/0367171 A1 12/2017 Tantawi et al.
2018/0014151 A1 1/2018 Kratz et al.
2018/0073065 A1 3/2018 Bowen
2018/0279461 A1 9/2018 Agustsson
2018/0343733 A1 11/2018 Mustapha et al.
2019/0070471 A1 * 3/2019 Medoff .................... C08H 8/00
2019/0159331 A1 * 5/2019 Lal ........................... H05H 7/08
2019/0320523 A1 10/2019 Agustsson et al.
2019/0326501 A1 * 10/2019 Gilbert .................... C04B 35/45
2020/0068699 A1 2/2020 Kutsaev et al.
2020/0092979 A1 * 3/2020 Agustsson ............... H05H 9/02
2020/0187344 A1 * 6/2020 Lal ........................... H05H 9/04
2021/0060358 A1 3/2021 Tantawi et al.
2021/0204389 A1 * 7/2021 Agustsson ............... H05H 9/02
2021/0219413 A1 7/2021 Agustsson et al.
2021/0398768 A1 12/2021 Graves et al.
2022/0039246 A1 * 2/2022 Agustsson ............. H05H 9/044
2022/0115758 A1 4/2022 Franzi et al.
2022/0307997 A1 * 9/2022 Meijer ................... C09K 11/65
2023/0082826 A1 * 3/2023 Agustsson ............. H05H 9/044 315/505
2023/0232523 A1 * 7/2023 Shinton .................. H01P 3/123 333/242

FOREIGN PATENT DOCUMENTS

CN 105555009 A 5/2016
EP 2421006 2/2012
EP 2516006 3/2014
EP 2823501 5/2019
JP 04-190599 7/1992
RU 2012140348 3/2014
WO WO 1997/041614 11/1997
WO WO 1997/041615 11/1997
WO WO-0231551 A1 * 4/2002 ......... G02B 6/12007
WO WO 2013/126120 8/2013
WO WO 2016/138395 9/2016
WO WO 2018/175804 9/2018
WO WO 2018/204714 11/2018
WO WO 2018/222839 12/2018
WO WO 2020/061204 3/2020
WO WO 2020/219578 10/2020
WO WO 2020/219586 10/2020
WO WO 2021/113323 6/2021

OTHER PUBLICATIONS

Ostroumov et al., "Compact Carbon Ion LINAC", Proceeding of NA-PAC2016 Chicago, IL, Oct. 14, 2016, pp. 1-3 (Year: 2016).
Ostroumov et al., "Compact Carbon Ion LINAC", Argonne National Laboratory NAPAC-2016, pp. 1-23 (Year: 2016).
Benedetti et al., High Gradient Linac for Proton Therapy, Physical Review Accelerators and Beams 20 120401, Apr. 13, 2017.
Cowley, Cyberknife 6D Robotic Radiosurgery Presentation, stored on Mar. 17, 2017.
Kutsaev, et al., A dual-energy linac cargo inspection system, Instruments and Experimental Techniques, 2011, vol. 54, No. 2, pp. 241-248.
Kutsaev, A New Thermionic RF Electtron Gun for Synchrotron Light Sources, in 4 pages.

(56) References Cited

OTHER PUBLICATIONS

Kutsaev, Beam Dynamics Studies for A Compact Carbon Ion Linac for Therapy, pp. 947-949.
Kutsaev, Sergey V., High Gradient S-band Accelerating Structure for Hadron Therapy Linac, Jun. 7, 2016, Radiabeam SYSTEMS, pp. 1-23.
Kutsaev, Hellweg2D code for design of high average power traveling wave linacs, Accelerator Seminar at SLAC National Accelerator Laboratory, Sep. 1, 2016 in 28 pages.
Kutsaev, et al. High Gradient Accelerting Structures for Carbon Therapy Linac, in 4 pages.
Kutsaev, et al., Accelerating Structure for C-Band Electron Linear Accelerator Optimization, Proceedings of LINAC08, Victoria, BC, Canada, pp. 922-924.
Kutsaev, et al., Beam optics Studies for a uranium ion micro beam, Oct. 2014, in 6 pages.
Kutsaev, et al., Compact 4KW Variable RF Power Coupler for FRIB Quarter-Wave Cavities, in 3 pages.
Kutsaev, et al., Compact Electron Linear Accelerator Relus-5 for Radiation Technology Application, Proceedings of EPAC 2006, Edinburgh, Scotland, in 3 pages.
Kutsaev, et al. , Electron Accelerators for Novel Cargo Inspection Methods, ScienceDirect, Physics Procedia 90 (2017) 115-125.
Kutsaev, et al., High Gradient Superconducting Cavity Development for FFAG, Sep. 2013, in 3 pages.
Kutsaev, et al., High Power RF Coupler for ADS Accelerating Cavities, Proceedings of SRF2013, Paris France, pp. 1050-1052.
Kutsaev, et al., High-gradient low-accelerating structure using the first negative spatial harmonic of the fundamental mode, Physical Review Special Topics—Accelerators and Beams, Dec. 2007, in 17 pages.
Kutsaev, et al., Hybrid Electron Linac Based on Magnetic Coupled Accelerating Structure, Applications of Accelerators, Tech Transfer, Industry Accel/Storage Rings 08: Linear Accelerators, pp. 2136-2138.
Kutsaev, et al., Improved charge breeding efficiency of light ions with an electron cyclotron resonance ion sourcem AIP Reivew of Scientifc Instruments 83, 2012 American Institute of Physics.
Kutsaev, et al., Input Couplers for the Dipole Mode Peridic Structures, Proceedings of RuPAC-2010, Protvino, Russia, pp. 328-331.
Kutsaev, et al., Magnetic Coupled Disk-Loaded Waveguide, Proceedings of RuPAC-2010, Protvino, Russia, pp. 319-321.
Kutsaev, et al.,Multipactor Simulations in Axisymmetric and Non-Axisymmetric Radio Frequency Structures, Proceedings of RuPAC 2008, Zvenigarad, Russia, pp. 215-217.
Kutsaev, et al. , Single-Shot THZ Spectrometer For Bunch Length Measurements, Logicware, Inc. New York, in 3 pages.
Kutsaev, et al., Upgrade of Argonne's CW SC Heavy Ion Accelerator, Proceedings of PAC2013, Pasadena, CA, pp. 737-739.
Kutsaev, Single-shot mm-wave spectrometer for RF breakdown detection in linear accelerators, Jun. 8, 2016, in 22 pages.
Kutsaev, Sergey V., et al. Electron Linac with Deep Energy Control for Adaptive Rail Cargo Inspection System, Manuscript received Dec. 7, 2015. This work has been partially supported by the US Department of Homeland Security, Domestic Nuclear Detection Office, under competitively awarded contract/IAA HSHQDC-13-C-B0019.
Smirnov, A.V., et al. Multi-cell disk-and-ring tapered structure for compact RF linacs, Nuclear Instruments and Methods in Physics Research A 830, 2016, pp. 294-302.
International Search Report—PCT/US2018/023881 filed Mar. 22, 2018, dated Aug. 9, 2018, 11 pages.
International Search Report—PCT/US2018/030980 filed May 3, 2018, dated Aug. 2, 2018, 6 pages.
International Search Report—PCT/US2018/035346 filed May 31, 2018, dated Sep. 6, 2018, 7 pages.

* cited by examiner

SPLIT STRUCTURE PARTICLE ACCELERATORS

CROSS-REFERENCE TO RELATED APPLICATIONS

This application is a continuation application of U.S. patent application Ser. No. 16/676,766, filed on Nov. 7, 2019, entitled "SPLIT STRUCTURE PARTICLE ACCELERATORS", which claims the benefit of priority under 35 U.S.C. § 111(a) to International Application No. PCT/US2018/035346, filed on May 31, 2018, entitled, "SPLIT STRUCTURE PARTICLE ACCELERATORS", and claims the benefit of priority under 35 U.S.C. § 119(e) to U.S. Provisional Application No. 62/513,911, filed Jun. 1, 2017, entitled "SPLIT LINEAR ACCELERATING STRUCTURES," each of which are hereby incorporated by reference herein in its entireties and for all purposes.

STATEMENT REGARDING FEDERALLY SPONSORED R&D

This invention was funded, in part, by government support under DOE Grant No. DE-SC0015722. The government has certain rights in the invention.

BACKGROUND

Field

The present disclosure relates to radiation technologies, in particular to beam generation and beam hardware.

SUMMARY

Modern radiation techniques tend to rely on bulky machinery with a limited scope of approaches for which radiation can be generated. Systems and methods disclosed herein address various challenges related to particle acceleration.

Described herein are various embodiments of linear accelerators ("linacs"), cyclic accelerators, and related components. A linac is a device commonly used for external beam radiation generation and may be used in medical treatments. As will become clear from the following disclosure, producing an effective high-gradient linac structure can present a variety of technical challenges, which may be solved by many of the novel features disclosed herein. While certain examples herein refer to a linac, those examples are equally applicable to other types of particle accelerators (e.g., cyclic accelerators).

A particle accelerator can include a first waveguide portion and a second waveguide portion. The first waveguide portion can include a first plurality of cell portions and a first iris portion that is disposed between two of the first plurality of cell portions. The first iris portion can include a first portion of an aperture such that the aperture is configured to be disposed about a beam axis. The first waveguide portion can further include a first bonding surface. The second waveguide portion can include a second plurality of cell portions and a second iris portion that is disposed between two of the second plurality of cell portions. The second iris portion can include a second portion of the aperture. The second waveguide portion can include a second bonding surface. In some embodiments, the first bonding surface is disposed adjacent the second bonding surface such that the first and second plurality of cell portions form a plurality of accelerating cells and the first and second iris portions form an iris and an aperture within the iris. Other embodiments, including structures and methods for the same, are described herein.

BRIEF DESCRIPTION OF THE DRAWINGS

Certain embodiments of the present disclosure will now be described, by way of example only, with reference to the accompanying drawings. From figure to figure, the same or similar reference numerals are used to designate similar components of an illustrated embodiment.

DETAILED DESCRIPTION

Figure 1A:
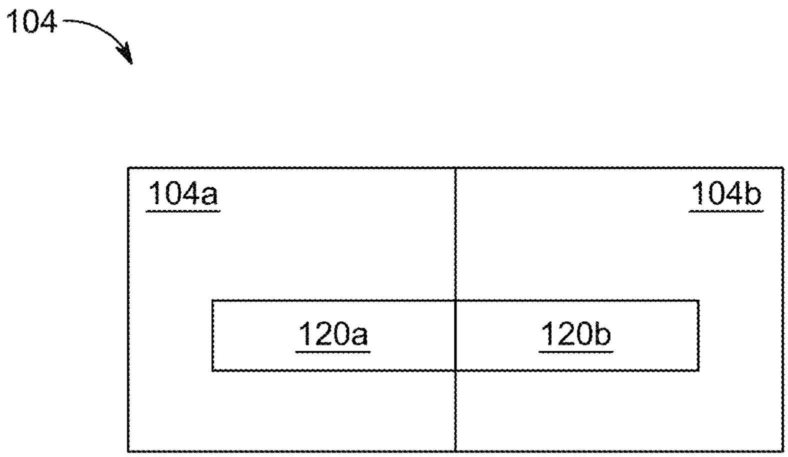
FIG. 1A shows a schematic of an example split linac.

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Linear accelerator ("linac"): a device for accelerating particles such as subatomic particles and/or ions where particles pass through each cell only once. A linac is one example of a particle accelerator.

Cell element (or sometimes "cell"): a component of a particle accelerator (e.g., a linear accelerator) that may include a cavity and an iris.

Accelerating cell: a cell through which particles are accelerated.

Particles: subatomic or atomic elements, such as hadrons, that can be accelerated in a particle accelerator.

Phase velocity: rate at which the phase of an electromagnetic wave propagates. The velocity may be positive or negative.

Beam velocity: average rate at which particles within a beam of particles are traveling over a small distance.

Overview

Particle accelerators, such as linear accelerators, can be used in a variety of applications, such as medical equipment, X-ray detection systems, radiation detection systems, irradiation, material discrimination, cargo inspection, nuclear forensics, and scientific research, among many other applications. Other accelerators may be cyclic rather than linear. Linear and cyclic accelerators are generally constructed using a plurality of individually manufactured (e.g., milled) cell elements that are then attached to each other using some sort of bonding technique, such as welding. Due to the individual nature of each cell and the subsequent assembly required, frequently these accelerators require tuning and testing after final assembly to fit performance specifications.

Advantageously, a split linear or cyclic accelerator can be manufactured. The split accelerator can include two sections that are subsequently joined. Each section can include a portion (e.g., half) of a one or more cells such that once the sections are joined together, the one or more cells are complete. In contrast with the accelerators described above where individual, complete cell components are manufactured and then assembled to create the accelerator, a split accelerator architecture allows for the construction or manufacture of fewer elements or portions, such as two halves. Each portion can be tuned during the manufacturing process so that little or no tuning is required after the final assembly. Because in some embodiments the spacing, sizing, proportions, and other dimensions of subsequent cell portions is at least partially already determined (e.g., since the cell portions are milled from a common block of metal), tuning requirements may be reduced or eliminated after manufacture of each accelerator portion. The reduction in the number of individual components that need to be manufactured and/or tuned can result in savings of time and cost in manufacturing and/or tuning.

Various embodiments disclosed herein employ a novel "split-linac" manufacturing approach that is highly compatible with micromachining. The term "split linac" may be used throughout, but the functionality may be applied to cyclic accelerators as well. Instead of machining dozens of precise individual cells, which often must then me brazed together and tuned, the accelerating structure may comprise two blocks of metal (e.g., copper) with a pattern micro-machined into the surface. The two blocks may then be joined together (e.g., welded, brazed, or diffusion bonded). This allows greater precision to be achieved at lower cost, reduces part count, eliminates issues with braze materials changing the dimensions of the cavities, and potentially eliminates the need for tuning.

Split Structure Particle Accelerators

A compact accelerating structure can comprise two milled halves, capable of producing an energetic (e.g., between about 0.1 MeV to 10 MeV) electron beam and converting the beam to X-ray radiation. The accelerating structure may have compact dimensions that can utilize an X- and/or K-band (including Ku- and Ka-sub-bands) magnetron. An S- and/or C-band wave generator can also be used. A lower-cost structure is achieved by reducing the number of elements to two pieces (comprising, for example, copper) with micro-milled accelerating cells.

The structures relate to linear accelerators and more particularly to compact split-structure accelerators that operate at microwave frequencies to drive an accelerating wave through the structure, which comprises two manufactured (e.g., micro-machined, electrical discharge machined (EDM)) portions of a diaphragmed waveguide to enable low-cost production. The structures may also be used in cyclic accelerators, such as circular accelerators. For example, the split accelerator may be applied to microtrons.

Such compact accelerating structures can be used in a variety of contexts, such as X-ray production or electron production. X-ray sources are used in a wide range of applications from cancer therapy to oil exploration. Some of the applications of these sources include non-intrusive inspection and active interrogation systems, such as methods for nuclear detection, material recognition, and industrial radiography. The structures may also be used in material or cargo inspection (e.g., using X-ray backscatter) or other computed tomography applications.

A cheap and compact X-ray source can utilize radioactive materials to produce X-rays. Replacement of radioisotopes used in these applications with a safer, electronic alternative enhances the above-mentioned methods with new capabilities, and reduces the risk of radioisotopes being used in radiological dispersal devices.

Particle accelerators can be used as X-ray sources by utilizing a Bremsstrahlung effect of X-ray radiation production by the deceleration of an electron by an atomic nucleus. However, conventional accelerators cannot compete with radioisotope sources in terms of compactness and cost. X-ray tubes can be used as a compact source of X-rays, but for the energies of 0.1-4 MeV that radioisotopes are mostly used they are still very bulky and expensive.

It is known that the volume of the accelerating structure scales inversely with the square of the operation frequency f (e.g., it may scale approximately with $f^{5/2}$), and by building an accelerator that operates at frequencies higher than the conventional linacs do (>3 GHz), it is possible to reduce the dimensions of the X-rays source to a portable size where it can compete with radioisotope sources. However, operation at such high frequencies has several limiting factors: availability of power sources, high dimensional sensitivity and extreme complexity of tuning and operational accelerating wave stability, and high price of accelerating waveguide fabrication with conventional separate cell technology.

The split linac design can provide a method of achieving a reduced cost of ultra-high gradient structures for high-energy physics accelerators as well. Split linacs can be micro-machined or molded. To machine the linac, an electrical discharge machining (EDM) process or other machining process may be used to achieve a dimensional tolerance of less than about 100 μm and may be less. For example, the techniques described herein may achieve a surface roughness of less than 5 μm and in some embodiments about 1 μm. Additionally or alternatively, a surface roughness of less than 1 μm may be achieved, such as about 200 nm.

Split linac designs described herein may be used at higher frequencies to both reduce the size of the linac and to reduce the manufacturing costs. Electromagnetic wave sources, such as magnetrons, can be used to provide K-band (e.g., Ku-band and/or Ka-band) frequencies. The split linac approach changes the paradigm of manufacturing and opens up the possibility of using modern micromachining approaches to achieve the required tolerances at very low cost.

Various embodiments can include a Ku-band (e.g., around 16 GHz) RF power magnetron. Ku-band RF can allow reduction in the size of X-band accelerator by about 44%. Ku-band magnetrons are relatively small and inexpensive and may require lower-voltages from the modulator. The Ku-band magnetron can produce up to 250 kW or more. In some cases, and without being limited by theory, a 60 kW peak power may be enough to provide 1 MeV energy to the electron beam in 20 cm length. A 1 kW peak power may be required for every 1 mA of accelerated current.

Some examples of uses of accelerators is in various detection systems, such as detectors for radioactive materials. Approximately 5,000 devices containing 55,000 high-activity radionuclide sources are in use in the United States today, in applications ranging from cancer therapy to oil exploration. Measurement of radioactive materials can be used as a tool to safeguard nuclear facilities. Enrichment plants can represent one of the most sensitive parts of the nuclear fuel cycle, yet safeguards at enrichment plants still remain a challenge for the International Atomic Energy Agency (IAEA). IAEA and the United States Department of Energy (DOE) have identified the replacement of radioactive sources with alternative technologies as a priority due to the risk of accidents and diversion by terrorists for use in Radiological Dispersal Devices.

An inexpensive, hand-portable accelerator may be used to replace $^{57}$Co radionuclide sources in various applications. Although, X-ray tubes can produce the required photon energies to replace $^{57}$Co, they may be too heavy and bulky to be attached for some applications and/or may not allow scaling to greater than 1 MeV energies to replace other radioisotope sources.

The cost and/or size of the linac can be reduced or minimized relative to alternatives to be suitable for the replacement of the $^{57}$Co source. In some embodiments, a Ku-band (e.g., at 16.4 GHz) RF power source can be used in the linac. Additionally or alternatively, a novel "split-linac" manufacturing approach, which is highly compatible with micromachining, can be used.

Turning now to the figures, various embodiments and variations of those embodiments will now be disclosed. FIG. 1A shows a schematic of an example split linac 104. The split linac 104 may include a first split linac portion 104*a* and a second split linac portion 104*b*. Each split linac portion 104*a*, 104*b* may include corresponding accelerating structure portions 120*a*, 120*b*. The accelerating structure portions 120*a*, 120*b* may include various features as described herein. For example, each of the accelerating structure portions 120*a*, 120*b* may include corresponding cell portions or other aspects that may cooperate with one another in providing linac functionality. As shown, the split linac portion 104*a* may be disposed adjacent the split linac portion 104*b*. Additionally or alternatively, the accelerating structure portion 120*a* may be in optical communication with the accelerating structure portion 120*b* to provide linac functionality as described herein.

Figure 1C:
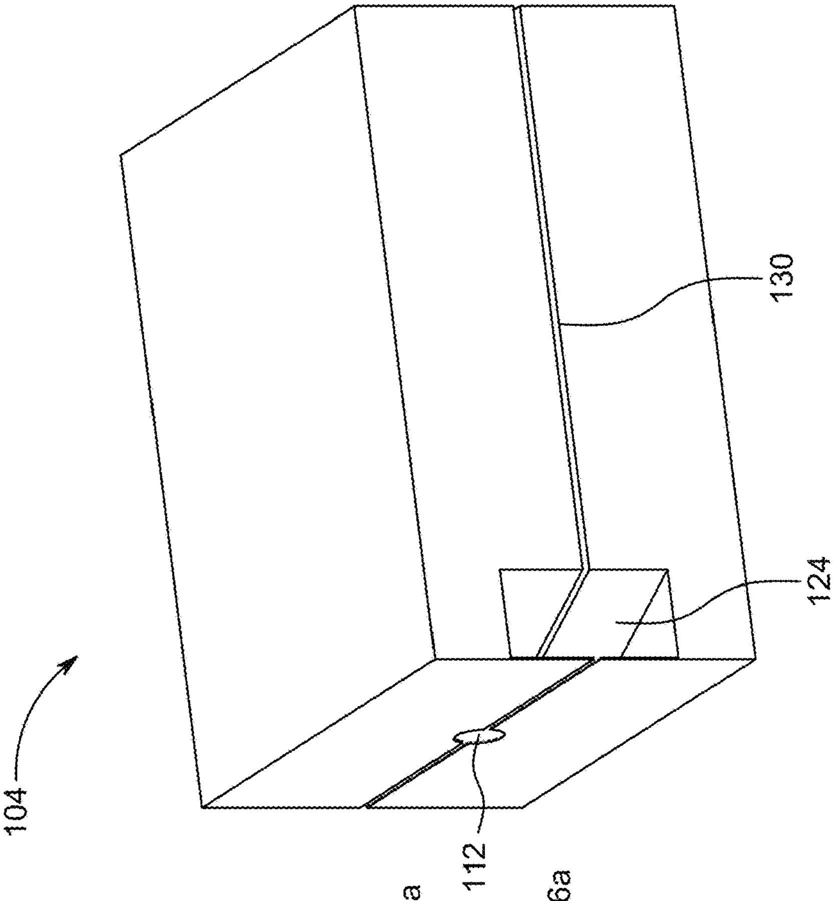
FIG. 1C shows the split linac of FIG. 1B where the two split linac portions have been attached to one another.
Figure 1B:
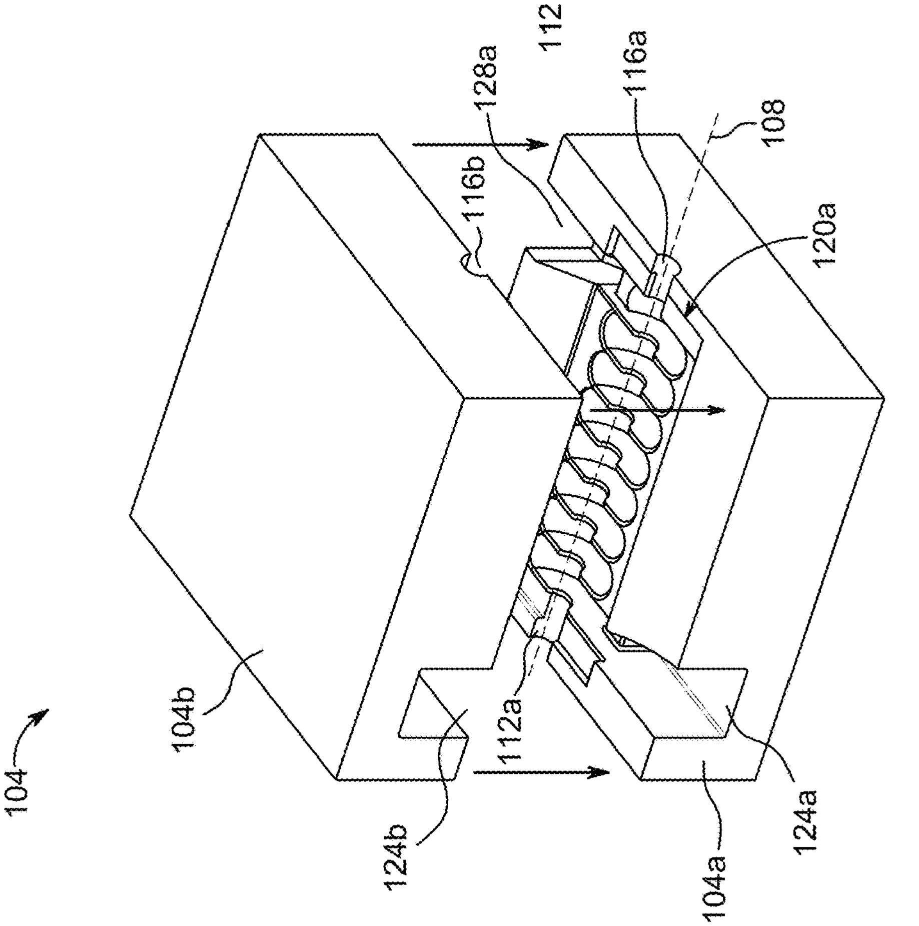
FIG. 1B shows an exploded view of an example split linac.

FIG. 1B shows an exploded view of an example split linac 104. The split linac 104 can include first and second split linac portions 104*a*, 104*b* as shown. One or more of the first and second split linac portions 104*a*, 104*b* may include a corresponding first linac entrance aperture portion 112*a* and/or a corresponding linac entrance aperture portion 112*b* (not shown in FIG. 1B). Additionally or alternatively, corresponding first and second linac exit aperture portions 116*a*, 116*b* may be included in the first and second split linac portions 104*a*, 104*b*. When the first and second split linac portions 104*a*, 104*b* are joined, the first and second linac entrance aperture portions 112*a*, 112*b* can form a linac entrance aperture 112. Additionally or alternatively, the linac exit aperture portions 116*a*, 116*b* can form a linac exit aperture 116. The linac entrance aperture 112 and/or the linac exit aperture 116 can define a beam axis 108. The split linac 104 can be configured to receive a beam of particles (e.g., protons, electrons, etc.) along the beam axis 108. The split linac 104 can be configured to receive the beam of particles into the linac entrance aperture 112 and to allow the beam to exit via the beam axis 108. As shown, an accelerating structure portion 120*a* may be included within the split linac portion 104*a*.

Each split linac portion 104*a*, 104*b* may include corresponding first and second RF input coupling element portions 124*a*, 124*b* and/or first and second RF output coupling element portions 128*a*, 128*b*. The combination of the first and second RF input coupling element portion 124*a*, 124*b* can form an RF input coupling element 124. Similarly, the combination of the first and second RF output coupling element portion 128*a*, 128*b* can form an RF output coupling element 128. The RF input coupling element 124 and/or the RF output coupling element 128 may be referred to as RF coupling cells.

The RF coupling cells can be configured to incouple/outcouple Ku-band RF power. Other wavelengths (e.g., X-band, S-band, etc.) are possible. Generally, the RF power is fed (e.g., from a power source such as a magnetron) into the split linac 104 via the RF input coupling element 124. The split linac 104 can outcouple excess RF power via the RF output coupling element 128.

FIG. 1C shows the split linac 104 of FIG. 1B where the two split linac portions 104*a*, 104*b* have been attached to one another. The split linac portions 104*a*, 104*b* may be attached in any number of ways. For example, the two split linac portions 104*a*, 104*b* may be welded, brazed, diffusion bonded, or adhered using another technique. The attachment between the split linac portion 104*a* and the split linac portion 104*b* may be along at least a portion of a seam 130. The split linac portion 104*a* may have an attachment surface and the split linac portion 104*b* may have a corresponding attachment surface, which are brought adjacent to one another for final attachment. One or both of the split linac portions 104*a*, 104*b* may include copper (e.g., pure copper, a copper alloy copper or other metal (e.g., stainless steel, aluminum, niobium, etc.). The complete split linac 104 may have a substantially regular shape. For example, the split linac 104 may be substantially a rectangular prism, as shown in FIG. 1C.

The split linac 104 can be used in a variety of applications that may necessitate different lengths and/or other dimensions. For example, the length of the split linac 104 (as measured along the beam axis) may be between 5 cm and 150 cm, between about 10 cm and 80 cm, and in some embodiments is about 25 cm. Longer linac structures may require higher RF power. The split linac 104 may operate at an energy of between about 30 keV and 500 keV and in some embodiments operates at an energy of about 150 keV.

The split linac 104 may operate using a traveling wave (TW) setup. However, in some embodiments, a standing wave (SW) configuration may be used. The split linac 104 can operate on a variety of frequencies. The split linac 104 may be configured to operate in between $\pi/2$-mode and $\pi$-mode (e.g., about $2\pi/3$-mode), but other configurations may be possible. The split linac 104 may be configured to receive an energy of less than about 10 MeV. The frequency of the RF power may be greater than about 6 GHz, greater than about 9 GHz, and in some embodiments may be greater than about 15 GHz. In some embodiments, the operation frequency may be between about 3 GHz and 300 GHz, and between about 10 GHz and 225 GHz in some embodiments. The energy may be received from an energy source described herein.

While various examples of a "split linac" are discussed herein with two split linac portions (e.g., 104*a*, 104*b*), in other embodiments a split linac may include additional portions. For example, a split linac may include three, four, or more split linac portions configured to be joined to form a linac. For example, in one embodiment, four quarter-portion linacs, each comprising substantially half of one of the split linacs 104*a* or 104*b*, can be joined to form a linac.

Figure 2:
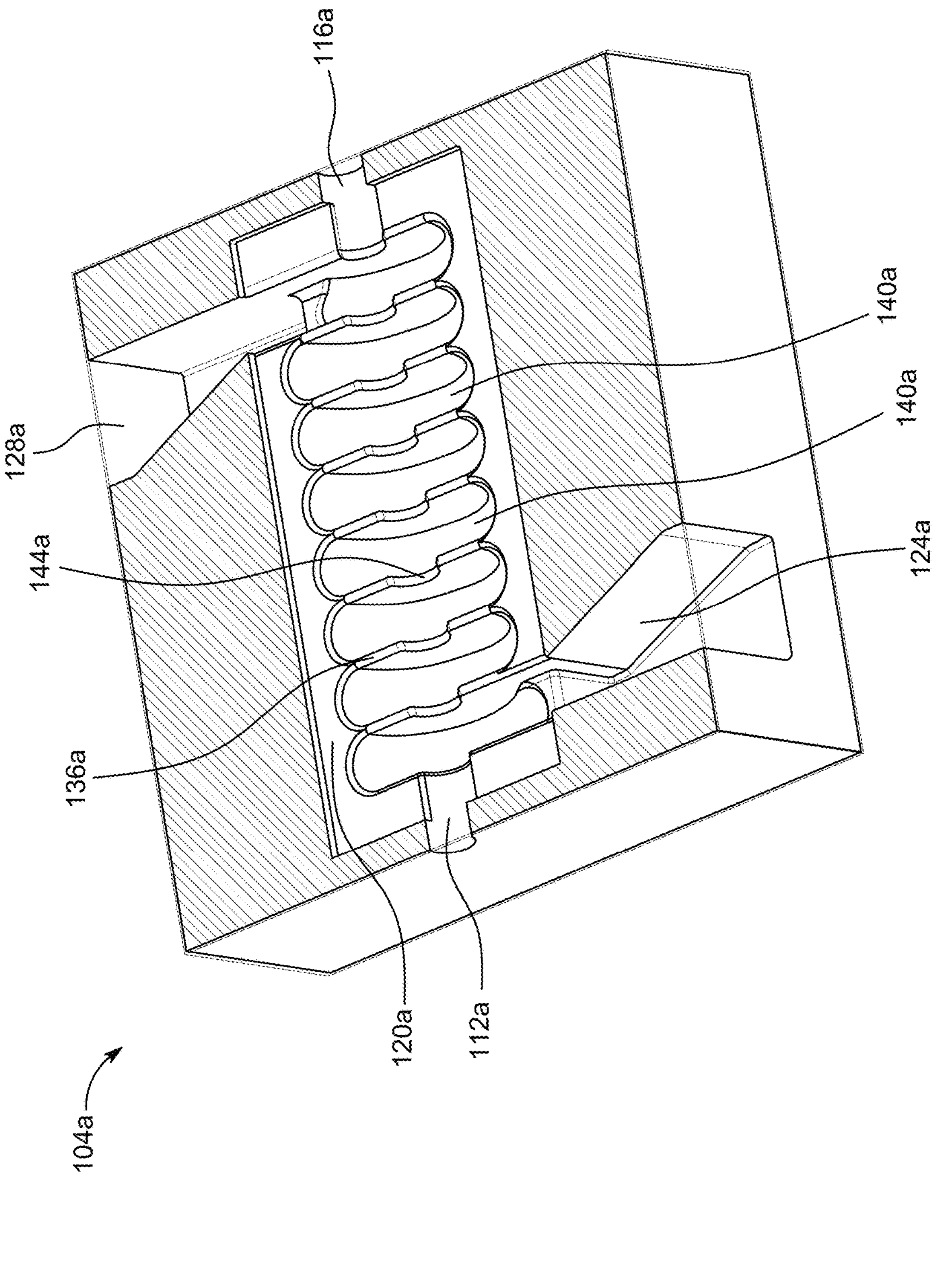
FIG. 2 shows a detail view of an example split linac portion shown in FIG. 1B.

FIG. 2 shows a detail view of an example split linac portion 104*a* shown in FIG. 1B. The split linac portion 104*a* can include the linac entrance aperture portion 112*a*, the linac exit aperture portion 116*a*, the RF input coupling element portion 124*a*, and the RF output coupling element portion 128*a* as described herein. The accelerating structure portion 120*a* may include a recessed portion from an attachment surface (indicated by the hashed area). The accelerating structure portion 120*a* can include one or more accelerating cell portions 140*a*. Between or within each accelerating cell portion 140*a*, a cell iris portion 136 may be disposed. The cell iris portion 136 may include a raised portion relative to neighboring one or more accelerating cell portions 140*a*. The a split linac portion 104*a* having a substantially semi-cylindrical internal surface with a plurality of ridges. Each of the plurality of ridges can be spaced apart along the beam axis 108 of the split linac portion 104*a*. Each of the plurality of ridges can extend radially from the semi-cylindrical internal surface. The attachment surface (e.g., bonding surface) may be included outside a region of the accelerating structure portion 120*a*. The second split linac portion 104*b* may have one or more features of the split linac portion 104*a* such that the split linac portion 104*a* and the split linac portion 104*b* may be attached to one another. In some embodiments, the split linac portion 104*a* and the split linac portion 104*b* exhibit partial or complete point symmetry (e.g., about a center point of the accelerating structure portion 120*a* and/or the accelerating structure portion 120*b*).

Each of the accelerating cell portions 140*a* can include a hollow space having the shape of a semi-cylinder or disk shape. The shape may be elliptical (e.g., ellipsoid, ovoid) or some other rounded shape. The portions removed to form the accelerating structure portions 120*a* can be removed radially from the beam axis 108. A length of each accelerating cell portion 140*a* may be measured between neighboring cell iris portions 136*a*. In some cases, the length of each accelerating cell portion 140*a* may be measured such that a given cell iris portion 136*a* is disposed at a center of the length.

Each of the cell iris portions 136*s* can include a corresponding plurality of iris aperture portions 144*a* therein. Each of the iris aperture portions 144*a* can be formed (e.g., milled, molded) to form a semi-circular space in the corresponding cell iris portion 136*a* when viewed along the beam axis 108. Accordingly, the portion removed for each iris aperture portion 144*a* can be in the shape of a disk or semi-cylinder. Each cell iris portion 136*a* can include a smooth surface.

The RF coupling element portions 124*a*, 128*a* can each have a narrowest portion nearest the accelerating structure portion 120*a* (e.g., radially proximal of the accelerating structure portion 120*a*) and an expanded portion or flared portion radially distal of the accelerating structure portion 120*a*.

The formation of the resulting split linac 104 can include taking a split linac portion 104*a* and a corresponding split linac portion 104*b* such that a spacing between respective pairs of adjacent ridges of the plurality of ridges of the split linac portion 104*a* along the beam axis 108 is approximately equal to a spacing between corresponding pairs of adjacent ridges of the plurality of ridges of the split linac portion 104*b* along the beam axis. The attachment surface of the split linac portion 104*a* and the corresponding attachment surface of the split linac portion 104*b* can be attached (e.g., bonded) together to define a joined structure. The structure can have a substantially cylindrical internal surface with corresponding ridges that form a plurality of accelerating cells 140. Each of the accelerating cell 140 can have a central aperture that is configured to allow a beam of charged particles to travel therethrough along the beam axis 108 extending through iris aperture 144 of each of the plurality of accelerating cells. Each of the split linac portion 104*a* and the split linac portion 104*b* can have corresponding RF input coupling element portion 124*a* and RF input coupling element portion 124*b* that form a resulting RF input coupling element 124 when finalized. Similarly, a RF output coupling element portion 128*a* and a RF output coupling element portion 128*b* can form a resulting RF output coupling element 128. The plurality of accelerating cells 140 can be in optical and/or fluid communication with the RF input coupling element 124 and/or the RF output coupling element 128. The RF input coupling element 124 can receive electromagnetic waves from a power source (e.g., a magnetron). The RF input coupling element 124 may be in communication with a first accelerating cell 140 and/or the RF output coupling element 128 may be in communication with a last accelerating cell 140. Each of the plurality of accelerating cells 140 may be configured to accelerate a beam of charged particles to a velocity of 0.1, 0.2, 0.3, 0.4, 0.5, 0.6, 0.7, 0.8, 0.9, or less than 1.0 times the speed of light, any value therebetween or within any range therein. The accelerating structure portion 120*a* can include one or more pluralities of accelerating cells 140. Each of the pluralities of accelerating cells 140 can be configured for accelerating particles at a different velocity or range of velocities relative to neighboring a neighboring plurality of accelerating cells 140. For example, subsequent pluralities of cells can be configured for accelerating the beam of particles at increasingly higher velocities. For more details, see, for example, FIG. 3.

Figure 3:
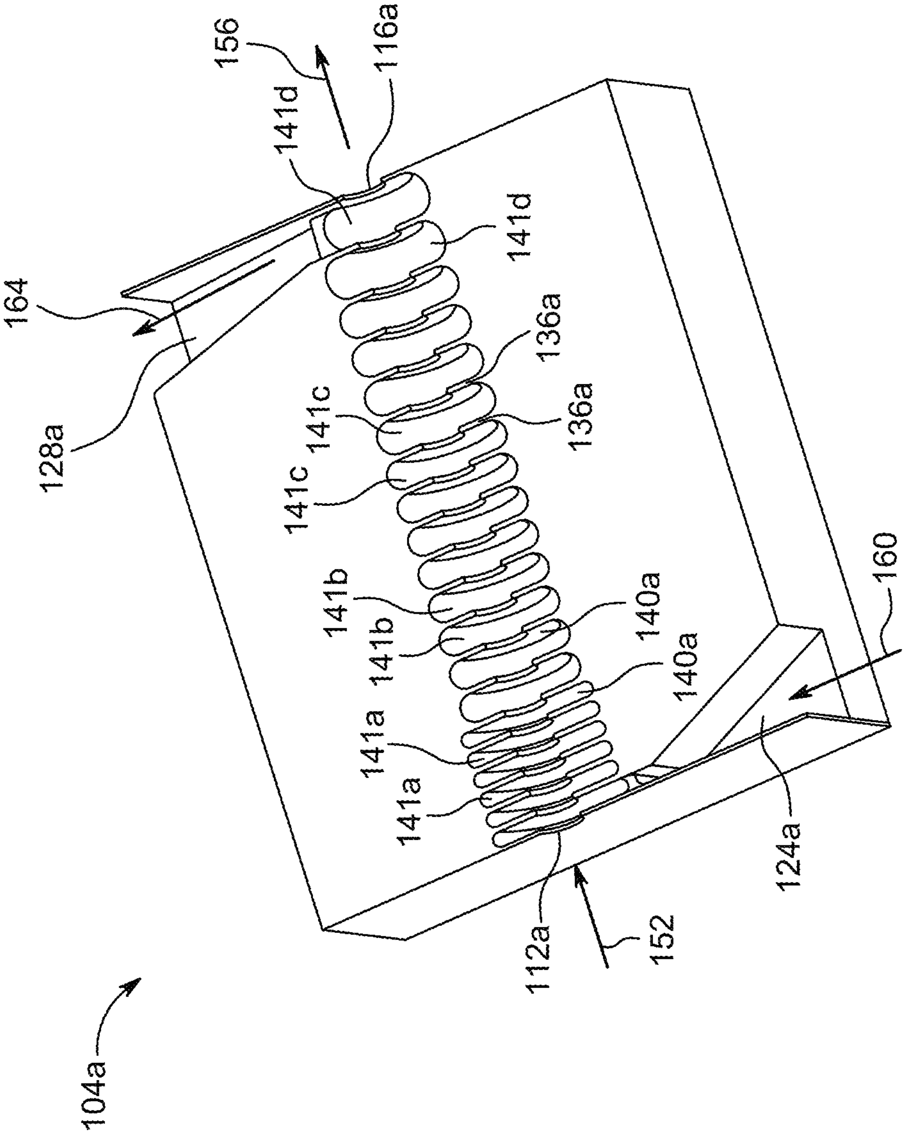
FIG. 3 shows another example of a split linac portion.

FIG. 3 shows another example of a split linac portion 104*a*. The split linac portion 104*a* shown in FIG. 3 does not include an accelerating structure portion 120*a*, but such an accelerating structure portion 120*a* can be included. As shown, a beam input 152 can represent an input for a beam of particles. A corresponding beam output 156 can represent an output of the beam of particles. The beam input 152 and the beam output 156 can be aligned with corresponding linac entrance aperture portions 112*a*, 112*b* and/or with corresponding linac exit aperture portion 116*a*, 116*b*. An RF input 160 can be via the RF input coupling element 124 and/or an RF output 164 can be via the RF output coupling element 128.

The plurality of accelerating cell portions 140*a* can include one or more cell types 141*a*, 141*b*, 141*c*, 141*d*. The first cell type 141*a* can be configured to accelerate particles at a velocity (which may roughly correspond to a phase velocity of the RF waves) of between about $\beta$=0.2 and $\beta$=0.8, between about $\beta$=0.3 and $\beta$=0.7, and in some embodiments at about $\beta$=0.3. The second cell type 141*b* can be configured to accelerate particles at a velocity of between about $\beta$=0.2 and $\beta$=1.0, between about $\beta$=0.3 and $\beta$=0.8, and in some embodiments at about β=0.5. The third cell type 141*c* can be configured to accelerate particles at a velocity of between about β=0.3 and β=1.0, between about β=0.4 and β=0.8, and in some embodiments at about β=0.6. The fourth cell type 141*d* can be configured to accelerate particles at a velocity of between about β=0.45 and β=1.0, between about β=0.55 and β=0.85, and in some embodiments at about β=0.7. Additional or fewer cell types may be included. In some embodiments, cells of the various types may be arranged in different quantities and/or orders than illustrated. In some embodiments, subsequent cell types are configured to accelerate particles at increasingly higher velocities. For example, in some embodiments, each cell of the first cell type 141*a* is configured to accelerate cells at about β=0.3, each cell of the second cell type 141*b* is configured to accelerate cells at about β=0.5, each cell of the third cell type 141*c* is configured to accelerate cells at about β=0.6, and/or each cell of the fourth cell type 141*d* is configured to accelerate cells at about β=0.7. Other configurations are also possible, such as cells with generally increasing β that have one or more higher-β initial cells (e.g., $\beta_1$=0.65, $\beta_{2-n}$>0.45, where the subscript refers to the cell number, with n being the total number of cells in the accelerator). The symbol beta ("β") can represent a ratio of the speed of light. For example, β=0.4 indicates a speed of 0.4 times the speed of light.

Figure 4:
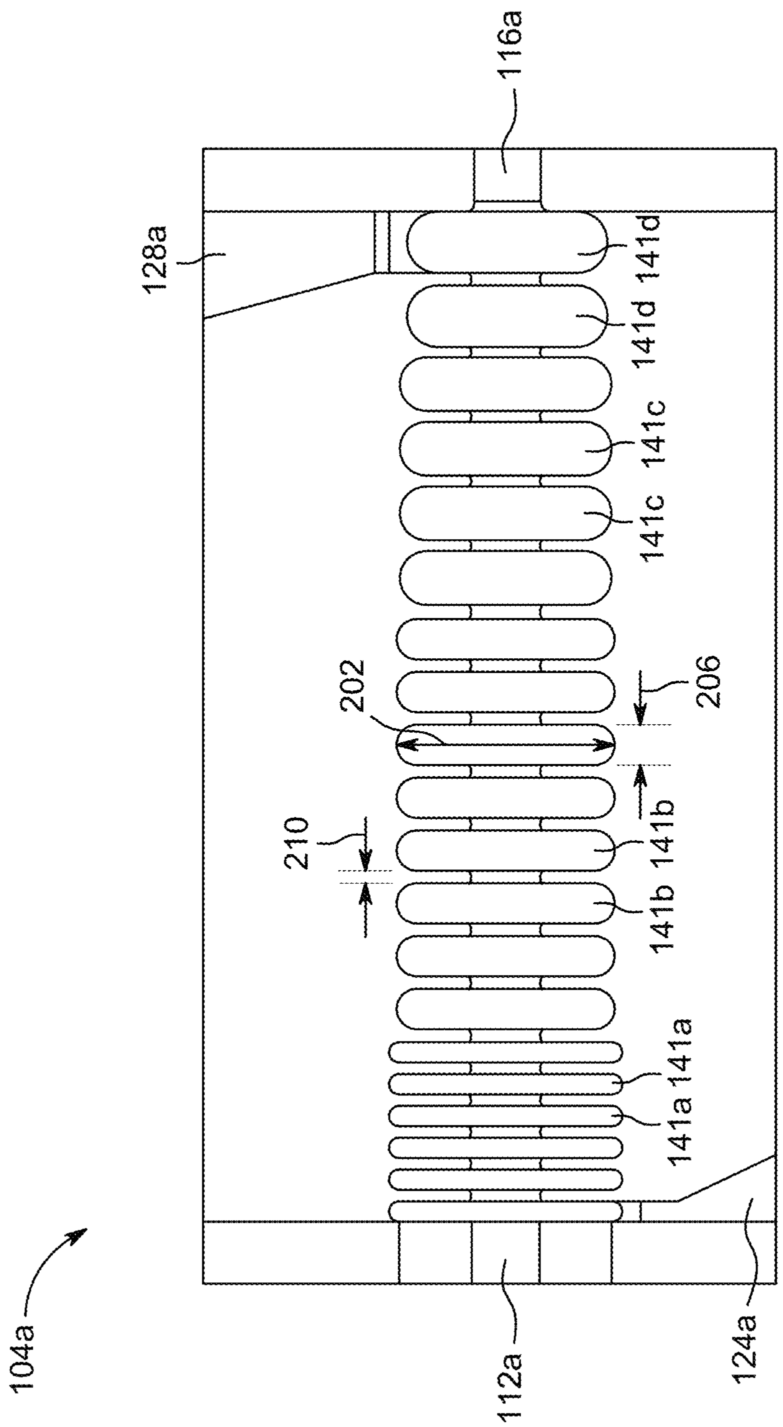
FIG. 4 shows a top view of another example of a split linac portion.

FIG. 4 shows a top view of another example of a split linac portion 104*a*. Throughout this description, while detail has been provided for a split linac portion 104*a*, a corresponding split linac portion 104*b* may similarly be constructed to form a resulting split linac 104. As shown in FIG. 4, each cell type 141*a*, 141*b*, 141*c*, 141*d* can have different physical parameters, such as those shown (though the cells may not be drawn to scale). An aspect ratio can be defined as a ratio of the cell diameter 202 to the cell length 206. The aspect ratio for cells may be 0.1, 0.2, 0.3, 0.4, 0.5, 0.6, 0.7, 0.8, 0.9, 1, 1.2, 1.4, 1.6, 1.8, 2, 2.5, 3, 3.5, 4, 4.5, 5, 6, 7, 8, 9, 10, 11, 12, 13, 14, 15, 16, 17, 18, 19, 20, any value therein, or fall within any range within any value therein. For example, in some embodiments, the aspect ratio may be about 1, 1.5, 8, or about 11, though other values are possible. The aspect ratio may decrease for subsequent cell types 141*a*, 141*b*, 141*c*, 141*d* along the beam axis 108.

The number of accelerating cells 140 of each cell type 141*a*, 141*b*, 141*c*, 141*d* may vary for each cell type. For example, the split linac 104 may include a greater number of lower-beta cells (e.g., accelerating cells 140 configured to accelerate particles at a relatively lower velocity than other accelerating cells 140) than higher-beta cells. The first cell type 141*a* can include between one and twenty cells, between two and fifteen cells, and in some embodiments (e.g., as shown) includes six cells. The second cell type 141*b* can include between one and thirty cells, between two and twenty cells, and in some embodiments (e.g., as shown) includes eight cells. In some embodiments the second cell type 141*b* can include between five and fifteen cells The third cell type 141*c* can include between one and fifteen cells, between two and twelve cells, and in some embodiments (e.g., as shown) includes four cells. The fourth cell type 141*d* can include between one and twelve cells, between two and ten cells, and in some embodiments (e.g., as shown) includes two cells. Additional or fewer cells 140 within each cell type may be included. The number of total cell types can be equal to or less than the total number of cells 140. For example, in some embodiments, each cell in the split linac 104 is unique and/or constitutes its own cell type. In some embodiments, the number of cell types is equal to one (e.g., all the cells are identical). Any number of cell types therebetween are possible. The split linac 104 can include between 1 and 120 accelerating cells 140, between 5 and 60 cells, and in some embodiments includes, for example, about 6, 8, 20, or 35 cells. In some embodiments, an initial accelerating cell 140 has a lower beta than a final accelerating cell 140. The beta value of groups of cells or individual cells may generally increase along the optical axis. For example, each cell may be configured to accelerate particles at a higher velocity (e.g., the cells have a higher beta) than each preceding cell. Other configurations are possible, such as others disclosed herein.

Figure 5:
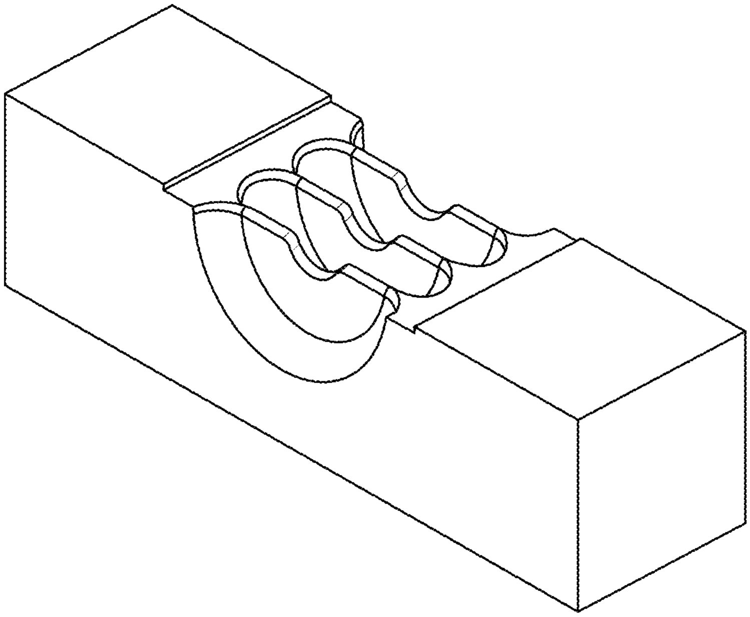
FIG. 5 shows an isometric view of a section of a split linac portion, including a section of an accelerating structure portion.
Figure 6:
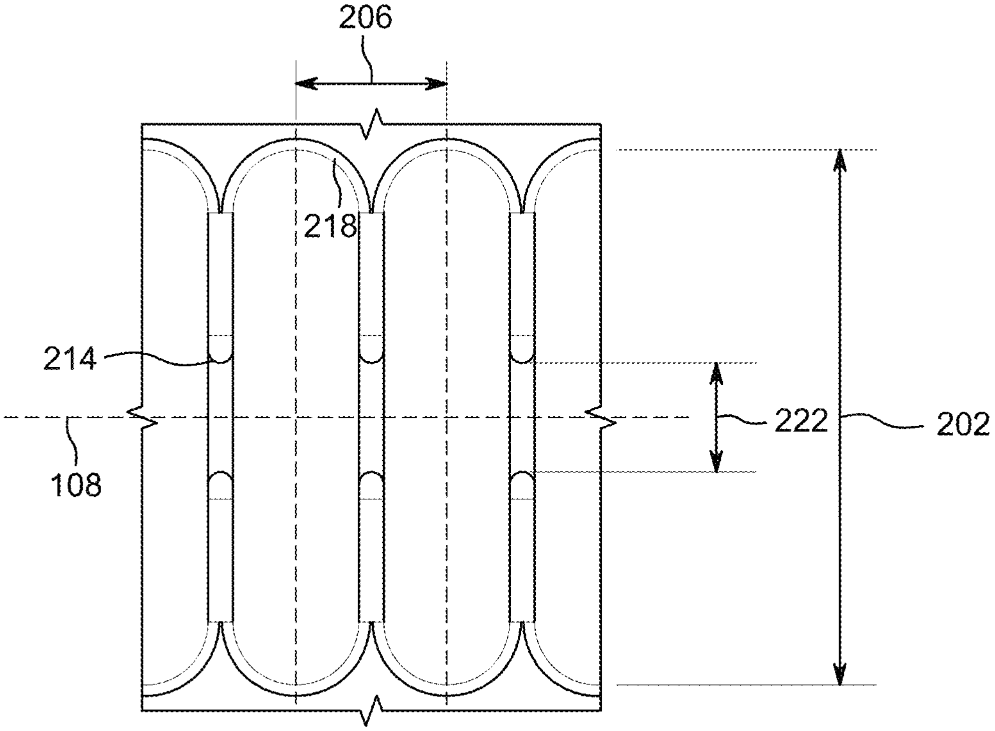
FIG. 6 shows a top view of an example section of a split linac portion.

FIG. 5 shows an isometric view of a section of a split linac portion 104*a*, including a section of an accelerating structure portion 120*a*. FIG. 6 shows a top view of an example section of a split linac portion 104*a*. Various dimensions are indicated. For example, a cell length 206 is shown as measured along the beam axis 108 such that the cell iris 136 is disposed at a midpoint along the cell length 206. The cell length 206 may be determined in part by the velocity of the beam of particles (which may be symbolized as "beta" (β)) and/or the wavelength of the EM waves (λ). The velocity of the beam of particles may be approximately equal to the phase velocity of the waves. The cell length 206 may be determined by a product of β and λ. For example, the cell length 206 (L) may be given by $L=\beta*\lambda*\theta/2\pi$, where θ is the phase advance of the cell 140. In certain wavelengths, the cell length 206 may scale with β such that the cell length 206 is approximated by β multiplied by 6.1 mm. The cell length 206 may be between about 0.5 mm and 5.5 cm, between about 1 mm and 6 mm, and in some embodiments is about 2 mm or 3 mm (depending on the cell type). For example, using S-band waves operating at a π-mode with β=1, the cells may be as long as about 5.5 cm. For a similar architecture in C-band, the cells may be about 2.6 cm. Shorter cells may be used, for example, when using Ka-band at a π/2-mode. Such cells may be about 0.9 mm long. Other variants are possible depending on the desired implementation.

The cell diameter 202, as measured perpendicular to the beam axis 108, can vary based on the type of cell, the wavelength used, and the velocity of the beam of particles. The cell diameter 202 can be between about 1 mm and 10 cm, between about 3 mm and 2 cm, and in some embodiments is about 1 cm, 8 cm, or 9 cm (depending on the cell type). The iris thickness 210 can be between about 0.1 mm and 30 mm, between about 0.3 mm and 2 mm, and in some embodiments is about 0.7 mm (depending on the cell type). The cell diameter 202 can be associated with the frequency of the RF power. For example, the chosen RF power may determine in part what the cell diameter 202 is. The iris thickness 210 may be advantageously small, but this may be limited by structural and thermal features of the split linac 104.

Other dimensions are shown, such as an iris blend radius 214 and a cell blend radius 218. The iris blend radius 214 can depend in part on the iris thickness 210. The iris blend radius 214 can be between about 0.05 mm and 5 mm, between about 0.1 mm and 1 mm, and in some embodiments is about 0.4 mm (depending on the cell type). The cell blend radius 218 can depend on the cell length 206 and/or on the iris thickness 210. It may be advantageous to improve the cell blend radius 218 by increasing the Q-factor. The maximum cell blend radius 218 may be determined by half the difference between the cell length 206 and the iris thickness 210. The cell blend radius 218 can be between about 0.05 cm and 20 cm, between about 1 cm and 5 cm, and in some embodiments is between about 0.3 cm and 0.5 cm or is about 2.5 cm (depending on the cell type). The cell blend radius 218 may advantageously be as large as possible to allow for improved linac operation. The iris aperture diameter 222 can be between about 0.1 mm and 50 mm, between about 1 mm and 15 mm, and in some embodiments is about 8 mm. The iris aperture diameter 222 can be associated with (e.g., be determined by) the strength of the field produced in the split linac 104.

Figure 7:
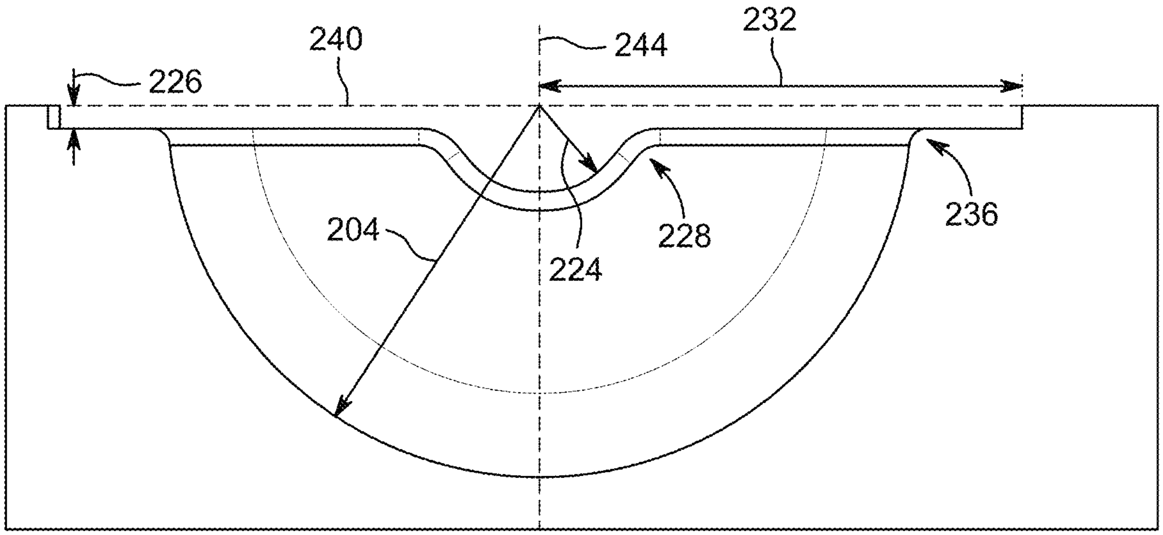
FIG. 7 shows additional dimensions of an example split linac portion.

FIG. 7 shows additional dimensions of an example split linac portion 104*a* that may be considered. A cell radius 204 is shown, which is half of the cell diameter 202. An iris aperture radius 224 is shown. The iris aperture radius 224 can be defined by an intersection of a gap plane 240 and a bisecting plane 244. The gap plane 240 may be coplanar, for example, with an attachment surface of the split linac portion 104*a*. A distance between the gap plane 240 and an accelerating surface can be given by a gap half-width 226, as shown. A transition between the accelerating surface and the surface defining the cell radius 204 can be described as a gap blend radius 236. A transition between the accelerating surface and a surface defining the iris aperture radius 224 can be described as an iris blend radius 228. A distance between the bisecting plane 244 and an end of the accelerating surface can be described as a gap half-length 232. The bisecting plane 244 can divide the split linac portion 104*a* into two portions where each accelerating cell portion 140*a* is bisected by the bisecting plane 244.

The split linac 104 can have various dimensions that may take on various values. For example, the cell radius 204 may be between about 1 mm and 100 mm, between about 5 mm and 65 mm, and in some embodiments is about 10 mm (e.g., at Ka-band) or about 90 mm (e.g., at S-band). The iris aperture radius 224 may be between about 0.5 mm and 20 mm, between about 2 mm and 15 mm, and in some embodiments is about 10 mm. The gap half-width 226 may be between about 0.5 mm and 15 mm, between about 1 mm and 10 mm, and in some embodiments is about 3 mm. The gap half-length 232 may be between about 0.5 cm and 10 cm, between about 2 cm and 7 cm, and in some embodiments is about 5 cm. In some embodiments, the gap half-length 232 is greater than the cell diameter 202. The iris blend radius 228 may be between about 0.5 mm and 35 mm, between about 1 mm and 20 mm, and in some embodiments is about 10 mm. The gap blend radius 236 may be between about 0.5 mm and 35 mm, between about 1 mm and 20 mm, and in some embodiments is about 10 mm.

Figure 8:
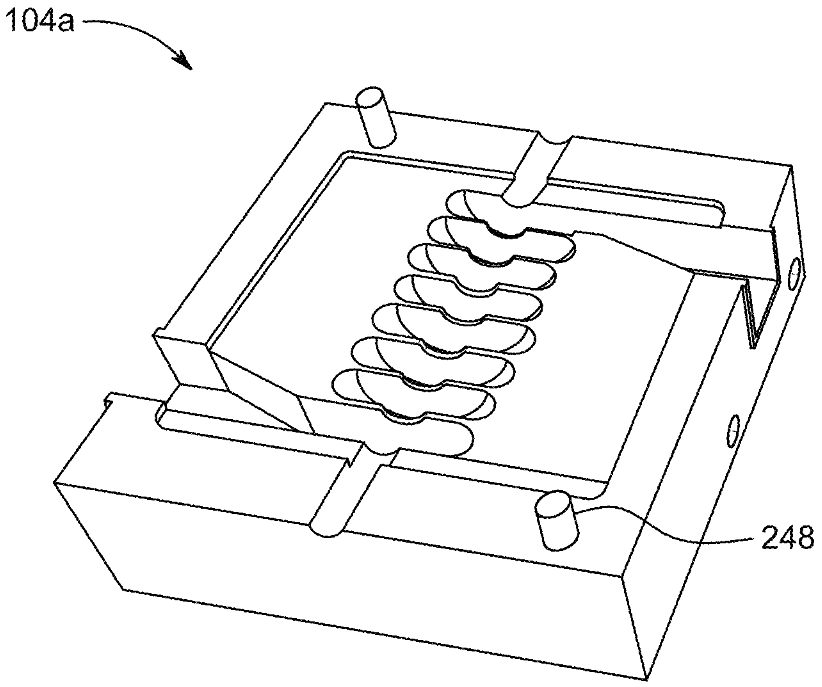
FIG. 8 shows an example split linac portion.
Figure 9:
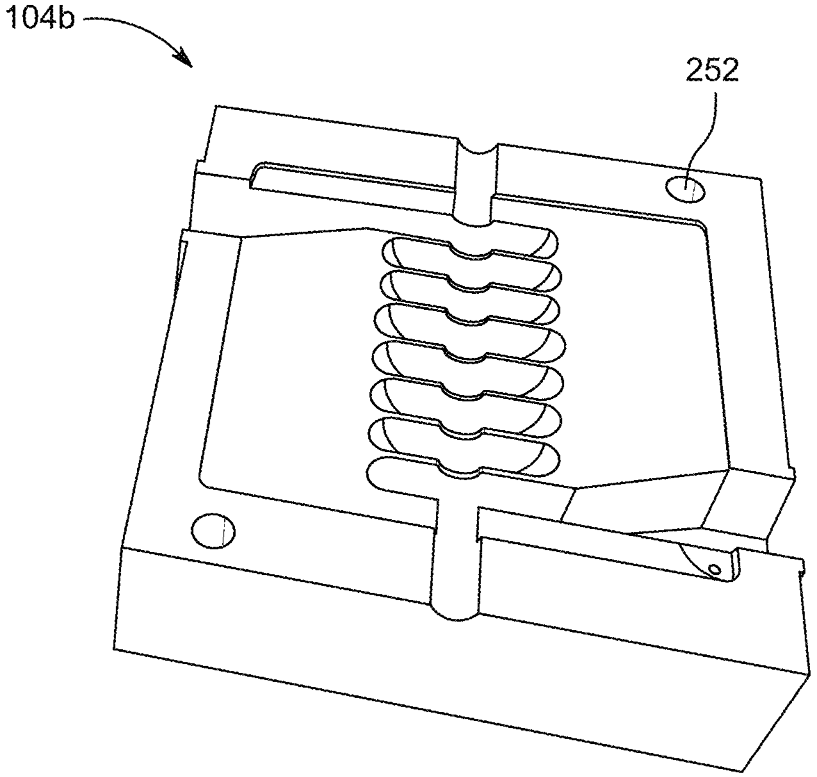
FIG. 9 shows an example split linac portion that can be attached to the split linac of FIG. 8.

FIGS. 8 and 9 show an example split linac portion 104*a* and an example split linac portion 104*b*, respectively. As shown, the split linac portion 104*a* can include one or more connecting elements 248. The split linac portion 104*b* can include corresponding one or more receiving portions 252. Each receiving portion 252 can receive a corresponding connecting element 248. The connecting element 248 may be a rod, a joint, a protrusion, or any other type of connector. The receiving portion 252 may be an opening, a recess, an attachment device, or any other type of device configured to receive the connecting element 248. In some embodiments, the connecting element 248 and receiving portion 252 are sufficient to keep the split linac portions 104*a*, 104*b* together and/or aligned sufficiently to undergo a bonding (e.g., welding, brazing, etc.) process.

Figure 10:
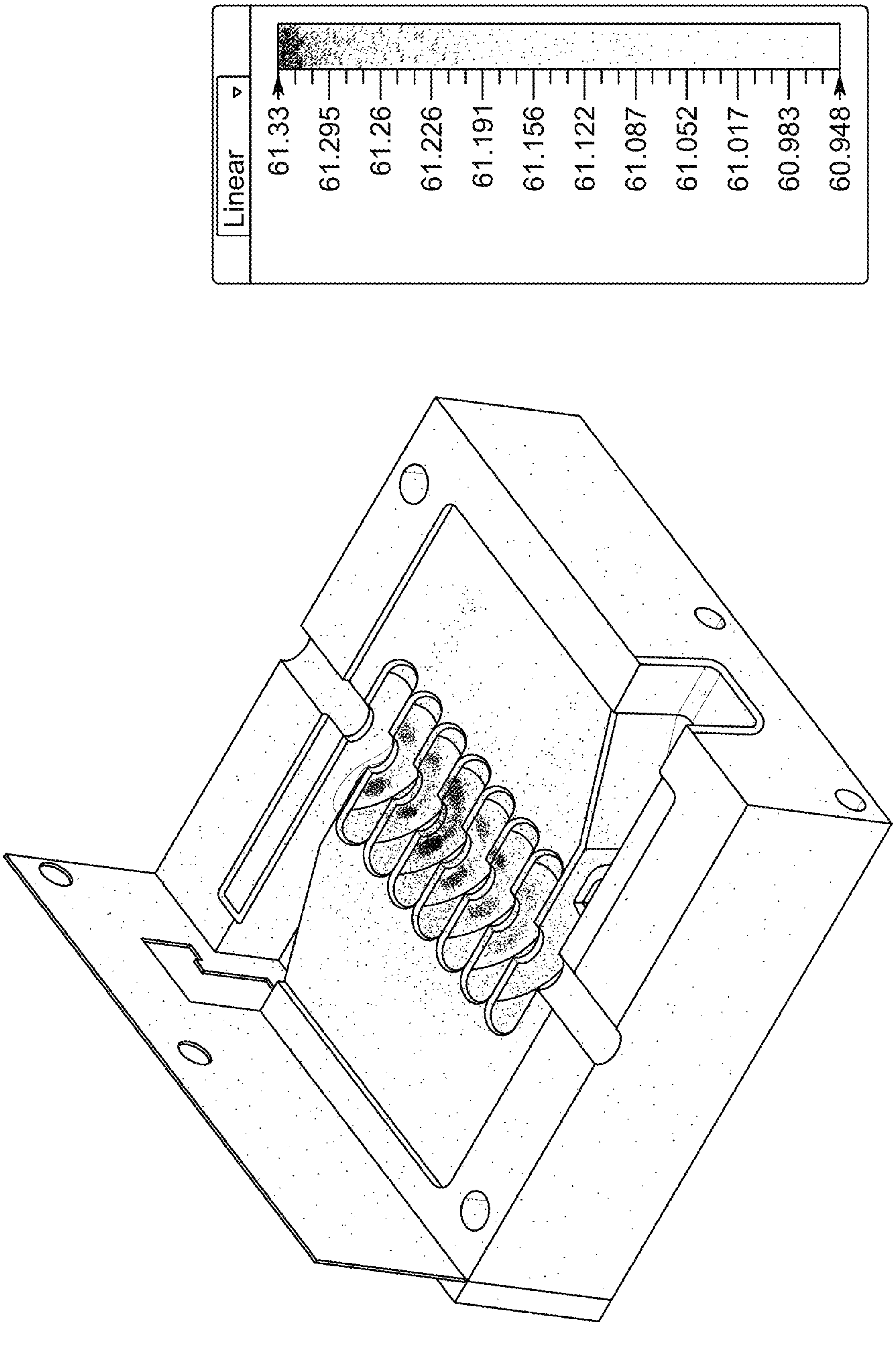
FIG. 10 shows a thermal performance heat map of an example split linac.

FIG. 10 shows a thermal performance heat map of an example split linac 104. The heat load shown assumes 50 W of RF average power. Two boundary conditions were considered: natural air convection (heat transfer coefficient of about 10 $W/m^2K$) and forced air convection from a moderate airflow fan with heat transfer coefficient of about 25 $W/m^2K$, which corresponds to less than about 5 m/s air flow speed. As shown in FIG. 17, the temperature of the structure rises from 20° C. to 40° C., but the temperature gradient inside the structure remains below 0.5° C. The temperature gradient (e.g., difference between two temperatures in the split linac 104) can indicate potential thermal deformations inside the structure and/or frequency deviations of the structure. Thus, lower temperature gradients can be advantageous.

Figure 11:
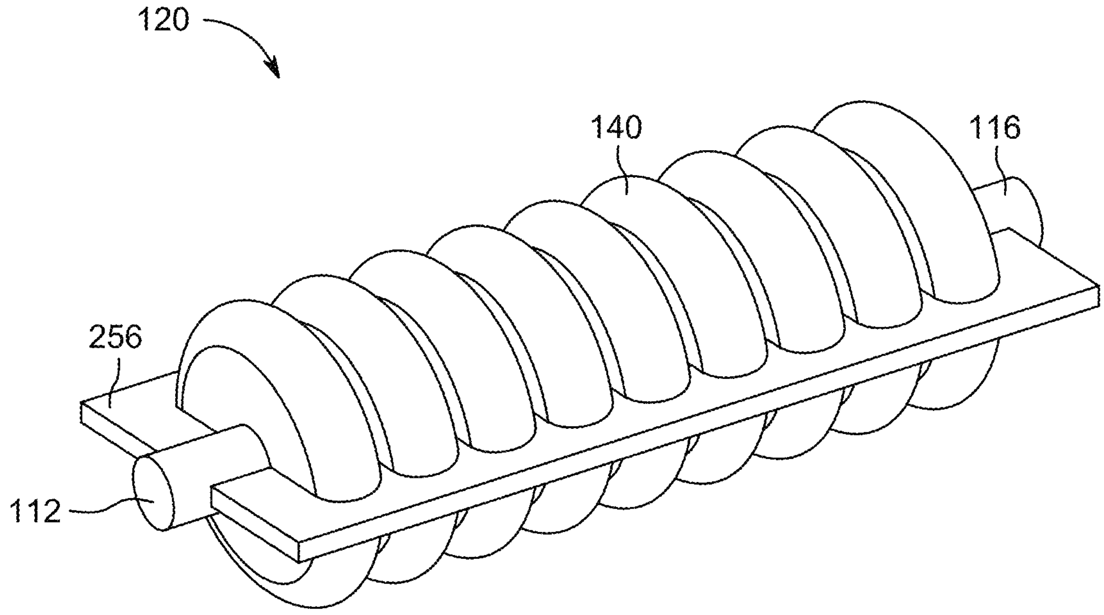
FIG. 11 shows an example accelerating structure.

FIG. 11 shows an example accelerating structure 120. The accelerating structure 120 may represent the negative space that is occupied by air/vacuum in one or more embodiments of the split linac 104 described herein. The accelerating structure 120 can include a plurality of accelerating cells 140 in sequence. However, as noted above, the accelerating cells 140 may be in a cyclic structure, such as a circular accelerator (e.g., microtron). As shown, the accelerating structure 120 can include a gap 256, which is indicated with reference to various embodiments of a split linac 104 herein. The accelerating structure 120 can include a linac entrance aperture 112 and a linac exit aperture 116. While the accelerating structure 120 is shown as having 9 cells, other configurations (including more or fewer cells) are possible. The gap 256 can advantageously allow for better vacuum pumping and/or for preventing beam break up (e.g., current instability). The gap 256 may also reduce the strain on the material of the split linac 104, such as copper or other material described herein. Reduced strain can allow for operation at greater temperatures, thus allowing for higher energy use and/or allowing for reduced cooling necessity.

Figure 12A:
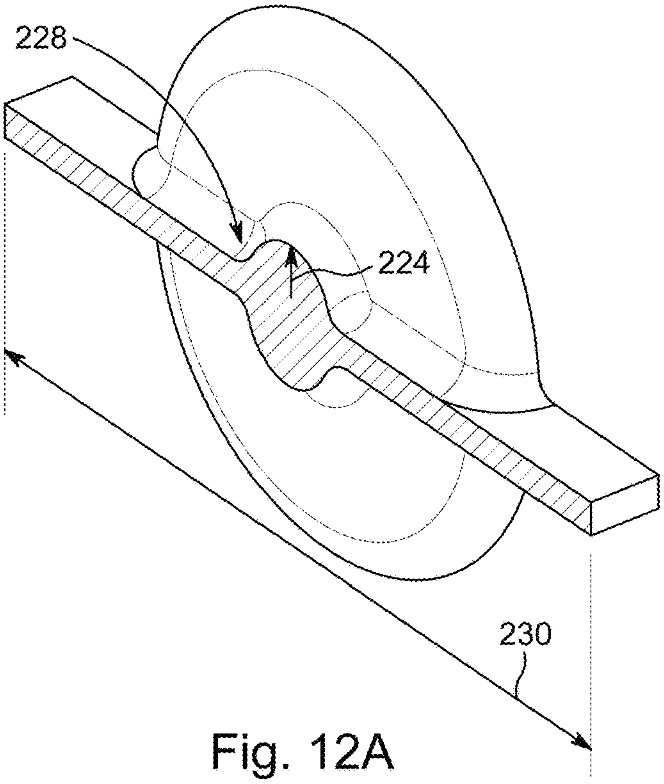
FIG. 12A shows an isometric view of a portion of an accelerating cell.
Figure 12B:
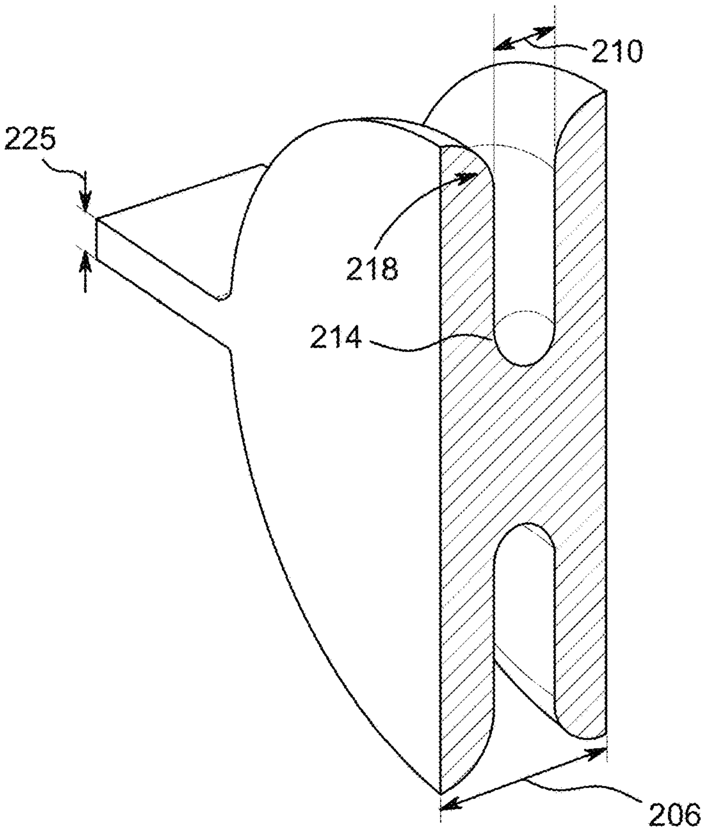
FIG. 12B shows some additional dimensions of an example accelerating cell.

FIGS. 12A-12B show portions of the accelerating structure 120 shown in FIG. 11. FIG. 12A shows an isometric view of a portion of an accelerating cell 140 with various dimensions labeled. Some dimensions are disclosed elsewhere herein. The gap length 230 may be between about 5 mm and 200 mm, between about 10 mm and 150 mm, and in some embodiments is about 20 mm. FIG. 12B shows some additional dimensions of an example accelerating structure 120. For example, the gap width 225 may be between about 0.1 mm and 30 mm, between about 1 mm and 10 mm, and in some embodiments is about 6 mm. The gap width 225 may be related to the wavelength of the RF power. For example, the gap width 225 can be greater than about 1 mm, which may depend on the frequency of the RF power. In some embodiments, the cell length 206 may be less than about half the wavelength.

Figure 13:
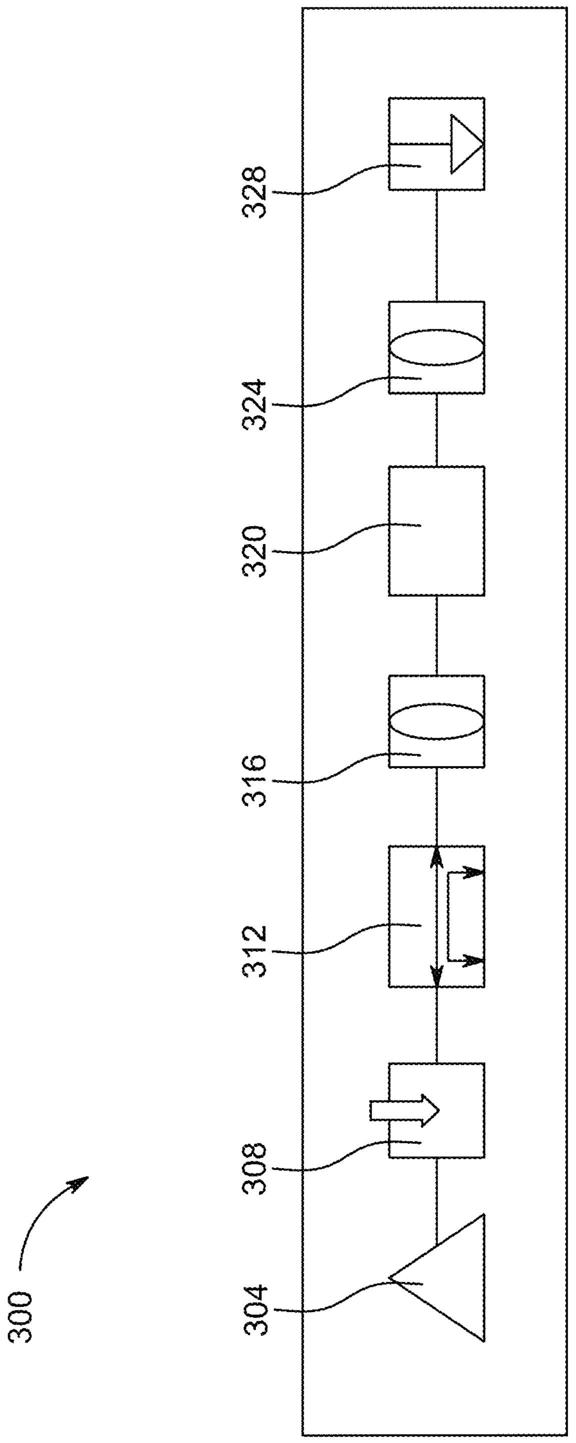
FIG. 13 shows a schematic of an example RF waveguide network.

FIG. 13 shows a schematic of an example RF waveguide network 300. The RF waveguide network 300 can include an energy source 304, a fluid inlet 308, a detector 312, an RF inlet aperture 316, a waveguide 320, a RF outlet aperture 324, and/or a capture device 328. The waveguide 320 can be purged with a fluid or gas (e.g., $SF_6$) to prevent the risk of arcing. The waveguide 320 may correspond to the accelerating structure 120 and/or the split linac 104 described herein. To isolate the vacuum volume of the accelerator from the waveguide, one or more microwave windows may be attached to the waveguide 320. The passive devices may have a ceramic barrier (e.g., ultra-high purity alumina) to block gas while still allowing microwave power to flow. To terminate the unused RF power, there may be a ferrite load at the output of the structure. The RF waveguide network 300 may be a particle source, such as a commercial diode gun with small cathode (e.g., less than 3 mm diameter) and focusing electrodes. The detector 312 may include a reflectometer. The RF waveguide network 300 can include a driver, such as a gun driver. The driver may be configured to provide approximately constant power to heat a filament inside a thermionic cathode. The gun driver may produce the HV pulses (e.g., 15 kV) to cause the gun to emit electrons and provide enough initial acceleration for the linac to efficiently capture the particles. In some embodiments, a thermionic gun may be used, which can emit electrons from a cathode heated to a sufficiently high temperature. The electron gun driver may be integrated with a magnetron modulator. The magnetron modulator's output may be tapped at a lower voltage portion of the circuit, which may allow driving the energy source 304 with the same pulse.

Figure 14A:
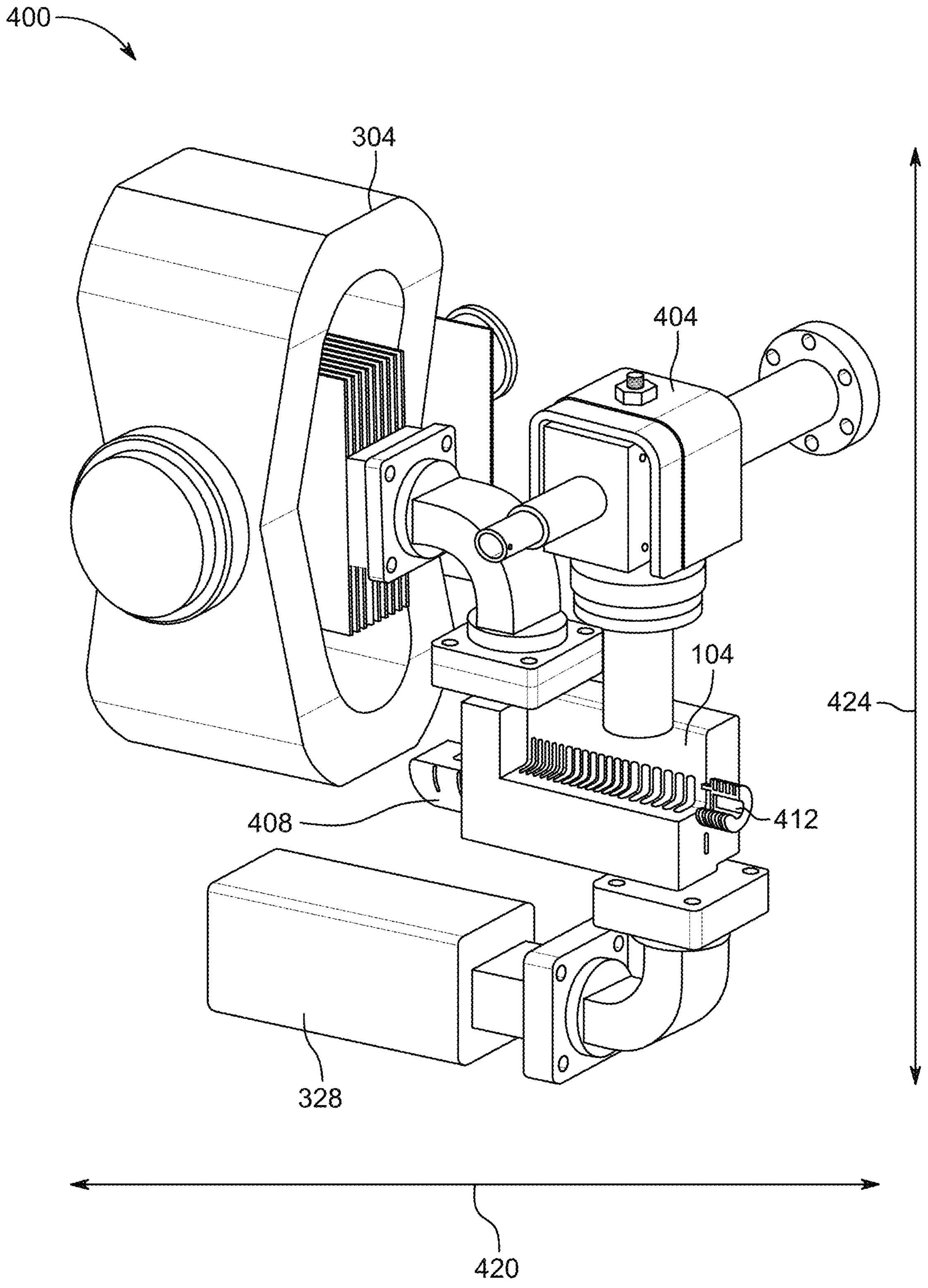
FIG. 14A shows an example linac head.
Figure 14B:
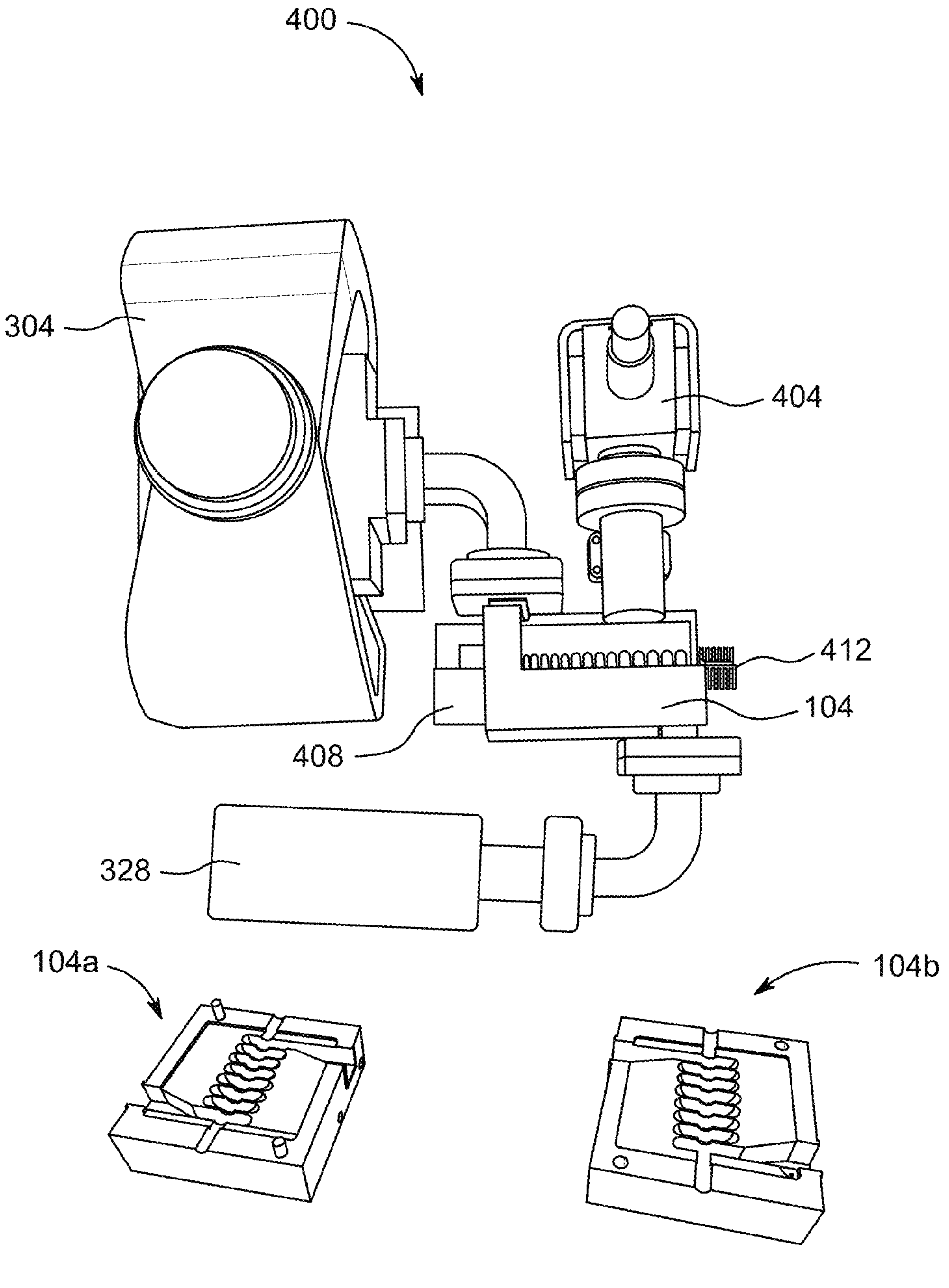
FIG. 14B shows another angle of the linac head, including the split linac portions.

FIG. 14A shows an example linac head 400 that may include one or more components described herein, such as those shown in FIG. 13. FIG. 14B shows another angle of the linac head 400, including the split linac portions 104*a*, 104*b* as an approximate size comparison. The individual elements may not necessarily be shown to scale. The linac head 400 may be included in a larger device, such as a detector, an X-ray machine (e.g., for medical applications), irradiation, material discrimination, cargo inspection, nuclear forensics, or some other device. As shown, the linac head 400 can include an energy source 304, a particle source 408, a vacuum pump 404, a split linac 104, a converter 412, and/or a capture device 328. The energy source 304 can be any energy source configured to emit electromagnetic waves for pumping into a split linac 104. For example, a magnetron may be used, such as a Ku-band magnetron. A lighter energy source 304 may be advantageous to allow, for example, for hand-held operation of the linac head 400. Additionally or alternatively, a relatively low anode voltage may be advantageous to reduce the power consumption and/or increase the efficiency of the energy source 304. The particle source 408 can include an electron gun, such as a diode electron gun. The energy source 304 can be configured to emit waves tuned to accelerate particles emitted by the energy source 304. The energy source 304 can inject energy into the split linac 104, such as through an input coupling element (e.g., the RF input coupling element 124 described herein). The energy source 304 can produce between about 10 kW and 250 kW, between about 25 kW and 95 kW, and in some embodiments produces about 50 kW power. In some embodiments, the energy source 304 can produce between about 200 kW and 3 MW. Higher energy sources (e.g., magnetrons up to 7 MW) can be used. The amount of power produced may be larger than a minimum necessary power (e.g., 40 kW). A safety margin between the power output and the minimum required output can allow operation in a lower power mode that may extend the lifetime of the energy source 304.

The particle source 408 can be configured to inject particles into the split linac 104 along a beam axis or optical axis. The output current may be regulated with the cathode temperature. For example, a high current density small dispenser cathode may be used to provide a relatively stable emission of up to 170 mA and/or up to or more than 10,000 hrs operation with greater than 95% of the initial cathode current. The cathode may have a diameter of only 1.45 mm. In other embodiments, an off-the-shelf compact diode electron gun may be used. Such an electron gun may be simpler to incorporate into the design and may have a focusing electrode to improve the acceptance of the beam.

The vacuum pump 404 can be configured to create and/or maintain a vacuum within the accelerating structure (e.g., the accelerating structure 120 herein) of the split linac 104. The total vacuum volume of the linac head 400 is relatively small, especially compared to conventional linacs. Accordingly, pumps with lower rates of pumping can be used. For example, rates such as 10 l/s may be sufficient for this device. Non-evaporable getter (NEG) pumps may be used. Such pumps may employ a hybrid pumping mechanism that uses a renewable chemical absorption pump (the NEG element) and a small ion pump. This may promote larger pumping speeds in a relatively compact package. For example, the pump may have a 100 l/s NEG element combined with a 5 l/s ion pump. After activation, the NEG element may require no electrical power. Thus, in some embodiments, the linac head 400 power requirements and weight can be reduced. When the system is stored, the ion pump can be reconnected to remove the noble gases that the NEG pump cannot.

The split linac 104 can have between 10 and 50 cells, such as those described herein. In some embodiments, the particles (e.g., electrons) can be incident on a converter 412 to produce energy, such as X-rays. The capture device 328 can be configured to receive an RF load capable of dissipating up to about 100 kW of peak RF power, up to about 80 kW, and in some embodiments up to about 60 kW of peak RF power.

The linac head 400 can be configured to fit into specific dimensions. It may be advantageous to create a smaller, more compact linac head 400 that can be hefted by a human. For example, the linac head 400 may have a linac head width 420 and a linac head height 424. The linac head width 420 can be between about 5 cm and 120 cm, between about 8 cm and 90 cm, and in some embodiments is about 18 cm. The linac head height 424 can be between about 10 cm and 200 cm, between about 15 cm and 150 cm, and in some embodiments is about 20 cm. The linac head depth (not shown in FIG. 14A) can be between about 3 cm and 70 cm, between about 5 cm and 50 cm, and in some embodiments is about 10 cm. The linac head 400 can have a total interior volume of between about 100 $cm^3$ and 15000 $cm^3$, between about 300 $cm^3$ and 10000 $cm^3$, and in some embodiments is about 3600 $cm^3$. A total weight of the linac head 400 can be between about 1 kg and 80 kg, between about 3 kg and 25 kg, and in some embodiments is about 5 kg.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended embodiments and/or claims and any equivalents thereof.

Example Embodiments

The following provides a list of examples of those described herein. This is a non-exhaustive and non-limiting list of examples.

In a 1st example, a linear accelerating structure for use in accelerating charged particles, the linear accelerating structure comprising: a first waveguide structure having a first substantially semi-cylindrical internal surface with a first plurality of ridges spaced apart along a first longitudinal axis of the first waveguide structure, each of the first plurality of ridges extending radially from the first substantially semi-cylindrical internal surface, wherein the first waveguide structure comprises a first bonding surface; and a second waveguide structure having a second substantially semi-cylindrical internal surface with a second plurality of ridges spaced apart along a second longitudinal axis of the second waveguide structure, each of the second plurality of ridges extending radially from the second substantially semi-cylindrical internal surface, wherein the second waveguide structure comprises a second bonding surface; wherein a first spacing between respective pairs of adjacent ridges of the first plurality of ridges along the first longitudinal axis is equal to a second spacing between a corresponding pair of adjacent ridges of the second plurality of ridges along the second longitudinal axis, and wherein the first bonding surface and the second bonding surface are configured to bind together to define a joined structure having a substantially cylindrical internal surface with corresponding ridges of the first and second plurality of ridges forming a plurality of accelerating cells each having a central aperture configured to allow a beam of charged particles to travel therethrough along a longitudinal axis extending through central apertures of each of the plurality of accelerating cells, the plurality of accelerating cells comprising an input coupling cell configured to receive electromagnetic waves from a magnetron; wherein at least one of the plurality of accelerating cells is configured to accelerate the beam of charged particles to a velocity between 0.1 and 1.0 times the speed of light; and wherein the joined structure is configured to propagate electromagnetic waves at a frequency greater than 1.0 GHz.

In a 2nd example, the linear accelerator of example 1, wherein at least one of the plurality of accelerating cells comprises an output coupling cell configured to direct an output of electromagnetic waves having a frequency greater than 1.0 GHz out of the joined structure.

In a 3rd example, the linear accelerating structure of any of examples 1-2, wherein the joined structure comprises one or more of copper, stainless steel, aluminum, or niobium.

In a 4th example, the linear accelerating structure of any of examples 1-3, wherein the first and second longitudinal axes are coaxial in the joined structure.

In a 5th example, the linear accelerating structure of any of examples 1-4, wherein the plurality of accelerating cells is configured to operate a standing electromagnetic wave at an operation mode.

In a 6th example, the linear accelerating structure of examples 5, wherein the operation mode is such that the phase of the wave in adjacent cells differs by an amount between $\pi/2$ and $\pi$.

In a 7th example, the linear accelerating structure of any of examples 1-4, wherein the plurality of accelerating cells is configured to house a traveling electromagnetic wave at an operation mode. The linear accelerating structure of example 7 may operate at an operation mode such that the phase of the wave in adjacent cells differs by an amount between $\pi/2$ and $\pi$.

In an 8th example, the linear accelerating structure of any of examples 1-8, wherein the joined structure has a total length measured along a beam axis of less than 1.0 m.

In a 9th example, the linear accelerating structure of any of examples 1-9, further comprising an electromagnetic generator configured to generate electromagnetic waves at a frequency greater than 1.0 GHz.

In a 10th example, the linear accelerating structure of any of examples 1-10, further comprising a charged particle generator configured to accelerate charged particles along a beam axis.

In an 11th example, the linear accelerator of any of examples 1-11 wherein the joined structure is configured to provide an acceleration gradient greater than 1 MV/m.

In a 12th example, the linear accelerating structure of any of examples 1-12, wherein the plurality of accelerating cells comprises a first accelerating cell and a second accelerating cell, the first accelerating cell configured to accelerate the beam of charged particles at a first velocity and the second accelerating cell configured to accelerate the beam of charged particles at a second velocity different from the first velocity.

In a 13th example, the linear accelerating structure of any of examples 1-13, wherein a joint formed by attachment of the first and second waveguide structures comprises a weld.

In a 14th example, the linear accelerating structure of any of examples 1-13, wherein a joint formed by attachment of the first and second waveguide structures comprises a braze.

In a 15th example, the linear accelerating structure of any of examples 1-13, wherein a joint formed by attachment of the first and second waveguide structures comprises a diffusion bond.

In a 16th example, a waveguide for use in accelerating charged particles, the waveguide comprising: a first structure comprising a first plurality of recesses spaced along a first axis; and a second structure comprising a second plurality of recesses spaced along a second axis; wherein a spacing between two adjacent recesses of the first plurality of recesses along the first axis matches a spacing between two corresponding adjacent recesses of the second plurality of recesses along the second axis; and wherein the first structure and the second structure are joined such that the first and second plurality of recesses form a plurality of accelerating cells, the plurality of accelerating cells configured to accelerate a beam of charged particles along a beam axis at a velocity between 0.1 and 1.0 times the speed of light.

In a 17th example, the waveguide of example 17, wherein each of the first plurality of recesses of the first structure forms a shape of a half-disc or ellipsoid.

In an 18th example, the waveguide of example 18, wherein the half-disc is oriented perpendicular to the beam axis.

In a 19th example, the waveguide of any of examples 17-19, wherein the first structure comprises a plurality of ridges separating each adjacent recess of the first plurality of recesses, each of the plurality of ridges forming half of an aperture configured to allow the beam of charged particles to travel therethrough along the beam axis.

In a 20th example, a method of manufacturing a linear accelerator, the method comprising: providing a first waveguide structure comprising a first plurality of recesses spaced apart along a first longitudinal axis of the first waveguide structure, the first plurality of recesses each extending radially from the first longitudinal axis of the first waveguide structure, wherein the first waveguide structure comprises a first bonding surface; providing a second waveguide structure comprising a second plurality of recesses spaced apart along a second longitudinal axis of the second waveguide structure, the second plurality of recesses each extending radially from the second longitudinal axis of the second waveguide structure, wherein the second waveguide structure comprises a second bonding surface; aligning the first plurality of recesses with the second plurality of recesses; and joining the first waveguide structure to the second waveguide structure such that the first and second plurality of recesses forming a plurality of accelerating cells of a joint structure; wherein each of the plurality of accelerating cells has a central aperture configured to allow a beam of charged particles to travel therethrough along a longitudinal axis extending through central apertures of each of the plurality of accelerating cells, the plurality of accelerating cells configured to accelerate the beam of charged particles to a velocity less than the speed of light.

In a 21st example, the method of example 21, wherein joining the first waveguide structure to the second waveguide structure to form the joint structure comprises electron beam welding.

In a 22nd example, the method of example 21, wherein joining the first waveguide structure to the second waveguide structure to form the joint structure comprises brazing.

In a 23rd example, the method of example 21, wherein joining the first waveguide structure to the second waveguide structure to form the joint structure comprises diffusion bonding.

In a 24th example, the method of any of examples 21-24, wherein joining the first waveguide structure to the second waveguide structure to form the joint structure comprises supplying a joining metal.

In a 25th example, the method of example 25, wherein the joining metal comprises copper.

In a 26th example, the method of example 25, wherein the joining metal comprises stainless steel.

In a 27th example, the method of any of examples 21-27, further comprising the step of forming the first plurality of recesses in the first waveguide structure.

In a 28th example, the method of example 28, wherein forming the first plurality of recesses in the first waveguide structure comprises milling.

In a 29th example, the method of example 28, wherein forming the first plurality of recesses in the first waveguide structure comprises electrical discharge machining.

In a 30th example, the method of any of examples 21-30, wherein the plurality of accelerating cells comprising an input coupling cell configured to receive electromagnetic waves from a magnetron.

In a 31st example, a particle accelerator comprising: a first waveguide portion comprising: a first plurality of cell portions; a first iris portion disposed between two of the first plurality of cell portions, the first iris portion comprising a portion of an aperture, the aperture configured to be disposed about a beam axis; and a first bonding surface; and a second waveguide portion comprising: a second plurality of cell portions; a second iris portion disposed between two of the second plurality of cell portions, the second iris portion comprising a portion of an aperture, the aperture configured to be disposed about a beam axis; and a second bonding surface; wherein: the first bonding surface is disposed adjacent the second bonding surface, the first and second plurality of cell portions form a plurality of accelerating cells, and the first and second iris portions form an iris.

In a 32nd example, the particle accelerator of example 32, wherein the aperture is configured to allow a beam of charged particles to travel therethrough along the beam axis.

In a 33rd example, the particle accelerator of any of examples 32-33, wherein the beam axis extends through a center of each of the plurality of accelerating cells.

In a 34th example, the particle accelerator of any of examples 32-34, further comprising an input coupling cell configured to receive electromagnetic waves therethrough.

In a 35th example, the particle accelerator of any of examples 32-35, wherein at least one of the plurality of accelerating cells is configured to accelerate a beam of charged particles to a velocity between 0.1 and 1.0 times the speed of light; and In a 36th example, the particle accelerator of any of examples 32-36, wherein the particle accelerator is configured to propagate electromagnetic waves at a frequency greater than 1.0 GHz.

In a 37th example, the particle accelerator of any of examples 32-37, wherein the particle accelerator is configured to operate at a mode between $\pi/2$ and $\pi$.

In a 38th example, the particle accelerator of any of examples 32-38, wherein a joint formed by attachment of the first and second waveguide portions comprises a braze.

In a 39th example, the particle accelerator of any of examples 32-39, wherein the joined structure is configured to provide an acceleration gradient greater than 1 MV/m.

What is claimed is:

1. A particle accelerator comprising:

a first waveguide portion comprising a first plurality of cell portions each comprising a corresponding bonding surface; and a second waveguide portion comprising a second plurality of cell portions each comprising a corresponding bonding surface;

wherein corresponding bonding surfaces of the first and second bonding surfaces of the respective first and second plurality of cell portions are coupled to one another to form a plurality of accelerating cells configured to couple to an RF input coupling element.

2. The particle accelerator of claim 1, further comprising the RF input coupling element, the RF input coupling element configured to couple RF power into the particle accelerator.

3. The particle accelerator of claim 1, wherein each of the first and second plurality of cell portions comprise corresponding aperture portions configured to form a plurality of apertures each configured to be disposed about a beam axis.

4. The particle accelerator of claim 3, wherein each of the apertures is configured to allow a beam of charged particles to travel therethrough along the beam axis.

5. The particle accelerator of claim 4, wherein the beam axis extends through a center of each of the plurality of accelerating cells.

6. The particle accelerator of claim 1, further comprising a first plurality of cells of a first cell type and a second plurality of cells of a second type different from the first type.

7. The particle accelerator of claim 1, wherein the particle accelerator is configured to propagate electromagnetic waves at a frequency greater than 1.0 GHz.

8. The particle accelerator of claim 1, wherein the particle accelerator is configured to operate at a mode between $\pi/2$ and $\pi$.

9. The particle accelerator of claim 1, wherein the joined structure is configured to provide an acceleration gradient greater than 1 MV/m.

10. A method of manufacturing a particle accelerator, the method comprising:

providing a first waveguide structure having a first plurality of cell portions each comprising a corresponding bonding surface;

providing a second waveguide portion comprising a second plurality of cell portions each comprising a corresponding bonding surface;

aligning the first plurality of cell portions with the second plurality of cell portions; and joining the first waveguide structure to the second waveguide structure such that the first and second plurality of cell portions form a plurality of accelerating cells configured to couple to an RF input coupling element.

11. The method of claim 10, further comprising coupling the RF input coupling element to the plurality of accelerating cells, the RF input coupling element configured to couple RF power into the particle accelerator.

12. The method of claim 10, wherein each of the first and second plurality of cell portions comprise corresponding aperture portions configured to form a plurality of apertures each configured to be disposed about a beam axis.

13. The method of claim 12, wherein each of the apertures is configured to allow a beam of charged particles to travel therethrough along the beam axis.

14. The method of claim 13, wherein the beam axis extends through a center of each of the plurality of accelerating cells.

15. The method of claim 10, wherein joining the first waveguide structure to the second waveguide structure comprises brazing.

16. The method of claim 10, wherein joining the first waveguide structure to the second waveguide structure comprises diffusion bonding.

17. The method of claim 10, wherein joining the first waveguide structure to the second waveguide structure comprises supplying a joining metal.

18. The method of claim 17, wherein the joining metal comprises copper.

19. The method of claim 10, further comprising milling the first plurality of recesses in the first waveguide structure.

20. The method of claim 10, wherein the plurality of accelerating cells comprises a first plurality of cells of a first cell type and a second plurality of cells of a second type different from the first type.

* * * * *